(12) United States Patent
Glassco et al.

(10) Patent No.: US 12,047,353 B2
(45) Date of Patent: Jul. 23, 2024

(54) VERIFIED ANONYMOUS PERSONA FOR A DISTRIBUTED TOKEN

(71) Applicant: Neone, Inc., Austin, TX (US)

(72) Inventors: Dave M Glassco, Austin, TX (US); Karl Eric Jarvis, Austin, TX (US)

(73) Assignee: Neone, Inc., Austin, TX (US)

( * ) Notice: Subject to any disclaimer, the term of this patent is extended or adjusted under 35 U.S.C. 154(b) by 164 days.

(21) Appl. No.: 17/745,793

(22) Filed: May 16, 2022

(65) Prior Publication Data

US 2022/0278967 A1 Sep. 1, 2022

Related U.S. Application Data

(63) Continuation-in-part of application No. 17/013,622, filed on Sep. 6, 2020, now Pat. No. 11,349,818, which is a continuation of application No. 16/215,605, filed on Dec. 10, 2018, now Pat. No. 10,798,069.

(51) Int. Cl.
| | |
|---|---|
| *H04L 29/06* | (2006.01) |
| *G06F 11/20* | (2006.01) |
| *H04L 9/08* | (2006.01) |
| *H04L 9/40* | (2022.01) |
| *H04W 12/033* | (2021.01) |
| *H04W 12/041* | (2021.01) |
| *G06F 9/455* | (2018.01) |

(52) U.S. Cl.
CPC ...... *H04L 63/0407* (2013.01); *G06F 11/2023* (2013.01); *H04L 9/0819* (2013.01); *H04L 63/0428* (2013.01); *H04W 12/033* (2021.01); *H04W 12/041* (2021.01); *G06F 9/45533* (2013.01); *G06F 2201/805* (2013.01); *H04L 63/0272* (2013.01); *H04L 63/0435* (2013.01); *H04L 63/0442* (2013.01)

(58) Field of Classification Search
CPC ................................................. H04L 63/0407
See application file for complete search history.

(56) References Cited

U.S. PATENT DOCUMENTS

| | | | | |
|---|---|---|---|---|
| 2022/0342958 A1* | 10/2022 | Lillard | ..................... | G06F 16/51 |
| 2023/0009908 A1* | 1/2023 | Castinado | ............. | H04L 9/0819 |
| 2023/0360006 A1* | 11/2023 | Patel | .................. | G06Q 20/3674 |
| 2023/0368184 A1* | 11/2023 | Polasa | .................. | G06Q 20/363 |

* cited by examiner

*Primary Examiner* — Bradley W Holder
(74) *Attorney, Agent, or Firm* — Steven Stupp

(57) ABSTRACT

A computer that provides one or more verified personas for a distributed token (such as a non-fungible token or NFT) of a first user is described. Notably, the computer may provide the one or more verified personas for the first user that are based at least in part on their account(s) with a provider of a secure, virtual private network (SVPN) of the first user. Consequently, the identity of the first user may be known to the provider. However, the one or more verified personas may obfuscate the known identity of the first user when conducting one or more discrete secure transactions (such as a transaction associated with a cryptocurrency or the NFT) using or associated with the distributed token. In particular, the first user may associate or link the one or more verified personas with the distributed token, thereby providing the benefits of privacy and selective (as-needed) identification.

20 Claims, 18 Drawing Sheets

VERIFIED ANONYMOUS PERSONA FOR A DISTRIBUTED TOKEN

CROSS REFERENCE TO RELATED APPLICATIONS

This application is a continuation-in-part of U.S. patent application Ser. No. 17/013,622, "Secure Virtual Personalized Network," by Dave M. Glassco, filed on Sep. 6, 2020, which is a continuation of U.S. patent application Ser. No. 16/215,605, "Secure Virtual Personalized Network," by Dave M. Glassco, filed on Dec. 10, 2018 (now U.S. Pat. No. 10,798,069), the contents of both of which is herein incorporated by reference.

FIELD

The described embodiments relate to techniques for associating one or more verified, but externally anonymous personas with a distributed token based at least in part on account information associated with a secure, virtual personalized network.

BACKGROUND

Blockchain is a distributed ledger technology (DLT) that is based at least in part on a peer-to-peer (P2P) topology. This distributed ledger technology may allow data to be stored globally on multiple (e.g., thousands) of computers, such that an arbitrary cryptographic network user may be able to see all the entries that appear at a given time in the distributed ledger. This capability makes it nearly impossible to gain control of the cryptographic network.

Moreover, a blockchain node is often an open-source, cross-platform runtime that allows developers to create various services. The P2P protocol associated with the distributed ledger may allow blockchain nodes to communicate with each other within a cryptographic network and to transfer information about transactions and new blocks or data structures in the distributed ledger.

A distributed ledger may store a distributed token, such as an NFT or another type of unique token. While cryptocurrencies are in general fungible (which means they can be traded or exchanged, one for another), NFTs shift the cryptocurrency paradigm by making each token unique and irreplaceable, thereby making it impossible for one NFT to be equivalent to another. Instead, they may be digital representations of assets and have been likened to digital passports because each token contains a unique, non-transferable identity to distinguish it from other tokens.

In principle, NFTs may also include or contain ownership information, which may facilitate owner identification and ownership transfer between token holders. However, the inclusion of ownership information may eliminate the anonymity of an owner. This may increase a risk that an owner of an NFT is targeted by malicious parties (such as criminals) or is the recipient of unwanted attention.

SUMMARY

In a first group of embodiments, a computer that provides a secure, virtual personalized network (SVPN) is described. This computer includes a network interface, a processor and memory. The network interface communicates with a group of electronic devices, which includes at least a first electronic device and a second electronic device. Moreover, the processor executes program instructions, stored in the memory, to provide the SVPN for the group of electronic devices. Notably, during operation, in response to a set-up request associated with the first electronic device of a first user, the computer may establish an instance of a virtual machine that provides a container for the SVPN of the first user. Note that the set-up request may occur when an account with a provider of the SVPN is established for the first user and a first instance of an application associated with the SVPN is provided to or installed on the first electronic device. This first instance of the application may provide master privileges in the SVPN to the first user.

For example, the request may be received from the first electronic device. Alternatively, the set-up request may originate within the computer, such as from installation program instructions executed by the computer and that set up the account and provide the first instance of the application. In some embodiments, the set-up request is received from another computer that sets up the account and provides the first instance of the application.

Moreover, when the first instance of the application is provided to the first electronic device or when the virtual machine is established, information that can be used to generate a set of first encryption keys (such as a first token) may be provided to the first electronic device. For example, the first token may include or may specify a generating function for the set of first encryption keys. However, in some embodiments, the computer may generate or select the set of first encryption keys, and then may provide the set of first encryption keys to the first electronic device. Note that the set of first encryption keys may not be stored in the memory and the computer may not be able to access the set of first encryption keys.

Furthermore, in response to an invitation message received from the first electronic device and which specifies an address associated with a second user, the computer may provide a guest message to the address with a link or information specifying the link to join the SVPN of the first user. In response to activation of or navigation to the link, the computer may provide, to a second electronic device associated with the second user, a second instance of the application associated with the SVPN that provides guest privileges in the SVPN of the first user, and thus allows the second user to join the SVPN of the first user. When the second instance of the application is provided to the second electronic device, information that can be used to generate a set of second encryption keys (such as a second token) may be provided to the second electronic device. For example, the second token may include or may specify a generating function for the set of second encryption keys. However, in some embodiments, the computer may generate or select the set of second encryption keys, and then may provide the set of second encryption keys to the second electronic device. The set of second encryption keys may include at least a second encryption key that is a counterpart to at least one encryption key in the set of first encryption keys that is reserved for communication between the first electronic device and at least the second electronic device, and which allow the second electronic device to securely communicate only with other electronic devices in the SVPN (such as the first electronic device or at least some of the group of electronic devices). Note that the set of second encryption keys may not be stored in the memory and the computer may not be able to access the set of second encryption keys.

Additionally, after the second user joins the SVPN, the computer may receive a first secure message from the first electronic device for the second electronic device. This first secure message may be encrypted using at least a first encryption key in the set of first encryption keys that is reserved for communication between the first electronic device and at least the second electronic device, and which allow the first electronic device to securely communicate at least with the second electronic device via the SVPN. In response, the computer may provide the first secure message to the second electronic device. In some embodiments, the computer may subsequently receive a second secure message from the second electronic device for the first electronic device. This second secure message may be encrypted using the second encryption key.

Note that the first secure message or the second secure message may be provided via one or more queues, which continue to attempt to provide the first secure message or the second secure message until they are, respectively, received by the second electronic device or the first electronic device. Then, the first secure message or the second secure message are removed or deleted from the one or more queues.

At least some of the aforementioned operations may be repeated for one or more additional electronic devices associated with one or more additional users, so that the one or more additional users can join the SVPN of the first user with guest privileges.

Moreover, in some embodiments, the first user can add one or more additional electronic devices to the SVPN, and which as associated with the account of the first user. As with the first electronic device, the one or more additional electronic devices may have master privileges in the SVPN. The one or more additional electronic devices may have access to the set of first encryption keys. For example, when the first user adds the one or more additional electronic devices to the SVPN, the first electronic device may provide the set of first encryption keys or information that specifies the set of first encryption keys to the one or more additional electronic devices.

Furthermore, in some embodiments, the first user may have a local computer that provides the same functions as the computer. In these embodiments, the computer may provide back-up and failover redundancy for the local computer. For example, the computer may copy at least some of the information on the local computer after a mirroring time interval has elapsed and, in the event of failure of the local computer, the computer may step in to provide or facilitate the SVPN. When the local computer is available again, the local computer may notify the computer and/or the group of electronic devices (such as the second electronic device) in the SVPN, so that communication traffic in the SVPN is routed or sent directly to the local computer again. Note that the local computer and the computer may communicate or ping each other after a proof-of-life time interval, so that the computer can confirm that the local computer is available. In some embodiments, the local computer also performs the functions of a router.

Moreover, the group of electronic devices may be remotely located from the computer Furthermore, the computer may be included in a distributed computer system, which may include two or more computers that each implement an instance of the program instructions, thereby providing failover redundancy. For example, the computer may provide the SVPN as a cloud-based service that is accessed by the group of electronic devices via another network, such as the Internet. Note that a provider of the computer or the computer system may be different from the provider of the SVPN.

Thus, the container in the computer may include the information (such as network locations or addresses) needed to route communication between the first electronic device and the group of electronic devices based at least in part on established and long-lived associations in the SVPN, and without assistance of another computer in the other network, which conveys the communication among the first electronic device, the computer and the group of electronic devices via at least a non-wireless communication technique, such as Ethernet. Note that the computer may support up to N SVPNs of N users, where N is an integer that is greater than zero and the N SVPNs have separate containers and are independent of each other. While, based at least in part on accepted invitations, electronic devices of users may be included in more than one SVPN, the communication within an SVPN may be independent of the communication in another SVPN.

In some embodiments, the computer sets up the account for the first user and provides the first instance of the application to the first electronic device in response to a request received from the first electronic device. For example, the program instructions may include the installation program instructions. When setting up the account, the computer may receive billing information (such as bank information or information that specifies a debit card or a credit card) that verifies the first user. Thus, in the SVPN, the first user may have an identity that is known to the provider of the SVPN. However, in some embodiments, the second user (and, more generally, users with guest privileges in the SVPN) may not be verified and, therefore, may have identities that are not known to the provider of the SVPN. Alternatively, in some embodiments, the users with guest privileges in the SVPN (such as the second user) may also be verified and, thus, having identities that are known to the provider of the SVPN.

Another embodiment provides the program instructions or the installation program instructions that, when executed by the computer or the local computer, perform at least some of the preceding operations of the computer or the local computer.

Another embodiment provides a method for providing a SVPN, which are performed by the computer or the local computer. This method includes at least some of the operations performed by the computer or the local computer.

Another embodiment provides the first electronic device or the second electronic device, which performs at least some counterpart operations to at least some of the preceding operations of the computer. For example, during operation, the first electronic device may use at least the first encryption key to generate the first secure message based at least in part on content received from the first user.

Another embodiment provides the application that, when executed by the first electronic device or the second electronic device, performs at least some counterpart operations to at least some of the preceding operations of the computer.

Another embodiment provides a method for communicating in a SVPN, which are performed by the first electronic device or the second electronic device. This method includes at least some of the operations performed by the first electronic device or the second electronic device.

In a second group of embodiments, a computer or a local computer provides a chat application (or service) for use by the first user and the second user, who are both verified, e.g., having known identities via their respective accounts with a provider of the chat application. For example, billing information included with the account information may verify the first user and the second user. In some embodiments, the chat application is an SVPN for a group of users, which includes the first user and the second user.

Another embodiment provides program instructions that, when executed by the computer or the local computer, perform at least some of the preceding operations of the computer or the local computer.

Another embodiment provides a method for providing a chat application or environment, which are performed by the computer or the local computer. This method includes at least some of the operations performed by the computer or the local computer.

In a third group of embodiments, a computer or a local computer provides a verified persona for a user of a social network provided by a different entity than a provider of the SVPN (or, more generally, when interacting with other users via the other network, such as the Internet). For example, the first user or the second user's identities may be known to the provider of the SVPN, such as via their respective accounts with the provider of the SVPN. However, a given user may be able to define one or more verified personas that are associated with their account(s) with the provider of the SVPN. The one or more verified personas may obfuscate the known identities of the given user when using the social network. Notably, the given user may be able to login to the social network using a given one of the one or more verified personas. This may allow the given user the benefits and privacy of selectively making themselves anonymous (and controlling what information about themselves is made public), while offering the protection of being able to identify the given user when needed (such as to prevent fraudulent, unwanted, criminal or dangerous activity in the social network. Notably, this capability may allow the social network to take appropriate remedial action.

Another embodiment provides program instructions that, when executed by the computer or the local computer, perform at least some of the preceding operations of the computer or the local computer.

Another embodiment provides a method for providing a verified persona, which is performed by the computer or the local computer. This method includes at least some of the operations performed by the computer or the local computer.

In a fifth group of embodiments, a computer that provides a secure, virtual personalized network (SVPN) with one or more preconfigured digital wallets is described. This computer includes a network interface, a processor and memory. Moreover, the processor executes program instructions, stored in the memory, to provide the SVPN. Notably, during operation, in response to a set-up request associated with the first electronic device of a first user, the computer may establish an instance of a virtual machine that provides a container for the SVPN of the first user. Note that the container includes the one or more preconfigured digital wallets associated with the first user, where a given preconfigured digital wallet includes cryptographic keys and a distributed ledger for use in conducting one or more distributed secure transactions (such as a blockchain transaction and, more generally, a transaction associated with a cryptocurrency or a non-fungible token or NFT).

Moreover, the distributed ledger may include a blockchain that stores one or more NFTs associated with the one or more distributed secure transactions.

Furthermore, the cryptographic keys may include encryption keys, such as a public encryption key and a private encryption key.

Additionally, the one or more preconfigured digital wallets may enable the first electronic device to process the one or more distributed secure transactions. Alternatively, the one or more preconfigured digital wallets may enable the first electronic device to perform the one or more distributed secure transactions in a second computer via the SVPN (and, more generally, via the SVPN and/or another network).

In some embodiments, the one or more preconfigured digital wallets may enable the first electronic device to perform cryptocurrency mining or to perform the function of an archive node that stores historical information associated with the one or more distributed secure transactions.

Note that the computer may provide, via the interface circuit, a first token intended for the first electronic device. This first token may generate the one or more preconfigured digital wallets on the first electronic device.

Moreover, the network interface may communicate with a group of electronic devices, which includes at least a first electronic device and a second electronic device, and the SVPN may be for the group of electronic devices.

Furthermore, the set-up request may occur when an account with a provider of the SVPN is established for the first user and a first instance of an application associated with the SVPN is provided to or installed on the first electronic device.

Note that the first instance of the application may provide master privileges in the SVPN to the first user.

For example, the request may be received from the first electronic device. Alternatively, the set-up request may originate within the computer, such as from installation program instructions executed by the computer and that set up the account and provide the first instance of the application. In some embodiments, the set-up request is received from a third computer that sets up the account and provides the first instance of the application.

Moreover, when the first instance of the application is provided to the first electronic device or when the virtual machine is established, information that can be used to generate a set of first encryption keys (such as a second token) may be provided to the first electronic device. For example, the second token may include or may specify a generating function for the set of first encryption keys. However, in some embodiments, the computer may generate or select the set of first encryption keys, and then may provide the set of first encryption keys to the first electronic device. Note that the set of first encryption keys may not be stored in the memory and the computer may not be able to access the set of first encryption keys.

Furthermore, in response to an invitation message received from the first electronic device and which specifies an address associated with a second user, the computer may provide a guest message to the address with a link or information specifying the link to join the SVPN of the first user. In response to activation of or navigation to the link, the computer may provide, to a second electronic device associated with the second user, a second instance of the application associated with the SVPN that provides guest privileges in the SVPN of the first user, and thus allows the second user to join the SVPN of the first user. When the second instance of the application is provided to the second electronic device, information that can be used to generate a set of second encryption keys (such as a third token) may be provided to the second electronic device. For example, the third token may include or may specify a generating function for the set of second encryption keys. However, in some embodiments, the computer may generate or select the set of second encryption keys, and then may provide the set of second encryption keys to the second electronic device. The set of second encryption keys may include at least a second encryption key that is a counterpart to at least one encryption key in the set of first encryption keys that is reserved for communication between the first electronic device and at least the second electronic device, and which allow the second electronic device to securely communicate only with other electronic devices in the SVPN (such as the first electronic device or at least some of the group of electronic devices). Note that the set of second encryption keys may not be stored in the memory and the computer may not be able to access the set of second encryption keys.

Additionally, after the second user joins the SVPN, the computer may receive a first secure message from the first electronic device for the second electronic device. This first secure message may be encrypted using at least a first encryption key in the set of first encryption keys that is reserved for communication between the first electronic device and at least the second electronic device, and which allow the first electronic device to securely communicate at least with the second electronic device via the SVPN. In response, the computer may provide the first secure message to the second electronic device. In some embodiments, the computer may subsequently receive a second secure message from the second electronic device for the first electronic device. This second secure message may be encrypted using the second encryption key.

Note that the first secure message or the second secure message may be provided via one or more queues, which continue to attempt to provide the first secure message or the second secure message until they are, respectively, received by the second electronic device or the first electronic device. Then, the first secure message or the second secure message are removed or deleted from the one or more queues.

At least some of the aforementioned operations may be repeated for one or more additional electronic devices associated with one or more additional users, so that the one or more additional users can join the SVPN of the first user with guest privileges.

Moreover, in some embodiments, the first user can add one or more additional electronic devices to the SVPN, and which as associated with the account of the first user. As with the first electronic device, the one or more additional electronic devices may have master privileges in the SVPN. The one or more additional electronic devices may have access to the set of first encryption keys. For example, when the first user adds the one or more additional electronic devices to the SVPN, the first electronic device may provide the set of first encryption keys or information that specifies the set of first encryption keys to the one or more additional electronic devices. In some embodiments, the one or more additional electronic devices may have access to the container.

Furthermore, in some embodiments, the first user may have a local computer that provides the same functions as the computer. In these embodiments, the computer may provide back-up and failover redundancy for the local computer. For example, the computer may copy at least some of the information on the local computer after a mirroring time interval has elapsed and, in the event of failure of the local computer, the computer may step in to provide or facilitate the SVPN. When the local computer is available again, the local computer may notify the computer and/or the group of electronic devices (such as the second electronic device) in the SVPN, so that communication traffic in the SVPN is routed or sent directly to the local computer again. Note that the local computer and the computer may communicate or ping each other after a proof-of-life time interval, so that the computer can confirm that the local computer is available. In some embodiments, the local computer also performs the functions of a router.

Moreover, the group of electronic devices may be remotely located from the computer Furthermore, the computer may be included in a distributed computer system, which may include two or more computers that each implement an instance of the program instructions, thereby providing failover redundancy. For example, the computer may provide the SVPN as a cloud-based service that is accessed by the group of electronic devices via another network, such as the Internet. Note that a provider of the computer or the computer system may be different from the provider of the SVPN.

Thus, the container in the computer may include the information (such as network locations or addresses) needed to route communication between the first electronic device and the group of electronic devices based at least in part on established and long-lived associations in the SVPN, and without assistance of another computer in the other network, which conveys the communication among the first electronic device, the computer and the group of electronic devices via at least a non-wireless communication technique, such as Ethernet. Note that the computer may support up to N SVPNs of N users, where N is an integer that is greater than zero and the N SVPNs have separate containers and are independent of each other. While, based at least in part on accepted invitations, electronic devices of users may be included in more than one SVPN, the communication within an SVPN may be independent of the communication in another SVPN. Moreover, electronic devices in the group of electronic devices that are associated with different users may include additional instances of containers, where a given additional instance of the contains may include one or more preconfigured digital wallets associated with a given one of the different users.

In some embodiments, the computer sets up the account for the first user and provides the first instance of the application to the first electronic device in response to a request received from the first electronic device. For example, the program instructions may include the installation program instructions. When setting up the account, the computer may receive billing information (such as bank information or information that specifies a debit card or a credit card) that verifies the first user. Thus, in the SVPN, the first user may have an identity that is known to the provider of the SVPN. However, in some embodiments, the second user (and, more generally, users with guest privileges in the SVPN) may not be verified and, therefore, may have identities that are not known to the provider of the SVPN. Alternatively, in some embodiments, the users with guest privileges in the SVPN (such as the second user) may also be verified and, thus, having identities that are known to the provider of the SVPN.

Another embodiment provides the program instructions or the installation program instructions that, when executed by the computer or the local computer, perform at least some of the preceding operations of the computer or the local computer.

Another embodiment provides a method for providing a SVPN, which are performed by the computer or the local computer. This method includes at least some of the operations performed by the computer or the local computer.

Another embodiment provides the first electronic device or the second electronic device, which performs at least some counterpart operations to at least some of the preceding operations of the computer. For example, during operation, the first electronic device may use at least the first encryption key to generate the first secure message based at least in part on content received from the first user.

Another embodiment provides the application that, when executed by the first electronic device or the second electronic device, performs at least some counterpart operations to at least some of the preceding operations of the computer.

Another embodiment provides a method for communicating in a SVPN, which are performed by the first electronic device or the second electronic device. This method includes at least some of the operations performed by the first electronic device or the second electronic device.

In a sixth group of embodiments, a computer or a local computer provides one or more verified personas for a distributed token (such as an NFT) of a first user. For example, the first user's identity may be known to the provider of the SVPN, such as via their account(s) with the provider of the SVPN. However, the first user may be able to define the one or more verified personas that are associated with their account(s) with the provider of the SVPN. The one or more verified personas may obfuscate the known identity of the first user when conducting one or more discrete secure transactions (such as a blockchain transaction and, more generally, a transaction associated with a cryptocurrency or the NFT) using or associated with the distributed token. Notably, the first user may associate or link the one or more verified personas with the distributed token of the first user. This may allow the first user the benefits and privacy of selectively making themselves anonymous (and controlling what information about themselves is made public), while offering the protection of being able to identify the first user when needed (such as to prevent fraudulent, unwanted, criminal or dangerous activity during the one or more discrete secure transactions. This capability may allow third parties (which are other than the first user or the provider of the SVPN) to selectively take appropriate remedial action.

Note that the distributed token may be included in one or more preconfigured digital wallets associated with the first user on a first electronic device of the first user. Moreover, a given preconfigured digital wallet may include cryptographic keys and a distributed ledger for use in conducting the one or more distributed secure transactions. Furthermore, the distributed ledger may include a blockchain that stores the distributed token associated with the one or more distributed secure transactions. Additionally, the cryptographic keys may include encryption keys, such as a public encryption key and a private encryption key.

In some embodiments, the one or more preconfigured digital wallets may enable the first electronic device to process the one or more distributed secure transactions. Alternatively or additionally, the one or more preconfigured digital wallets may enable the first electronic device to perform the one or more distributed secure transactions in a second computer via the SVPN (and, more generally, via the SVPN and/or another network).

Another embodiment provides program instructions that, when executed by the computer or the local computer, perform at least some of the preceding operations of the computer or the local computer.

Another embodiment provides a method for providing one or more verified personas, which is performed by the computer or the local computer. This method includes at least some of the operations performed by the computer or the local computer.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
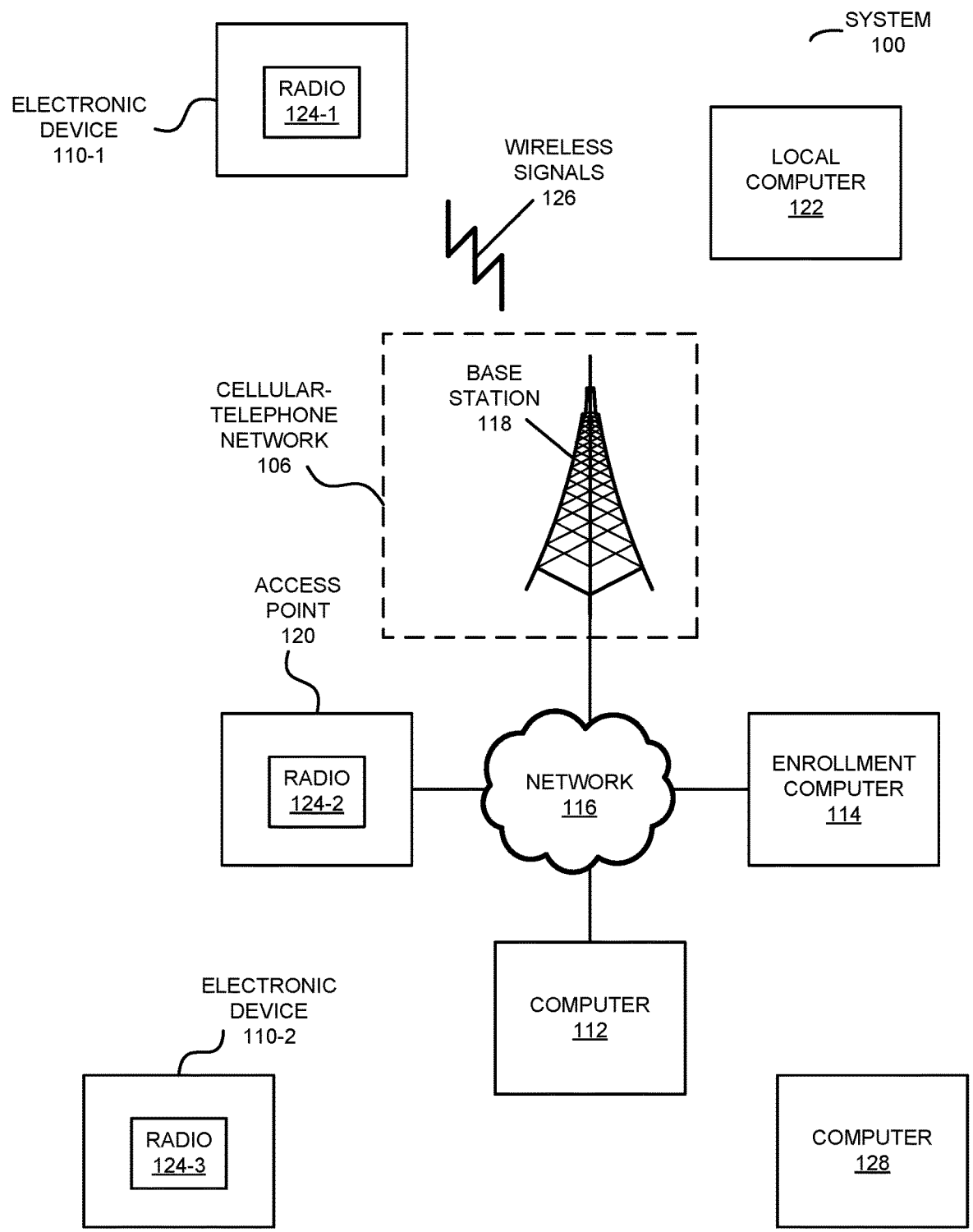
FIG. 1 is a block diagram illustrating an example of a system with electronic devices communicating in accordance with an embodiment of the present disclosure.

In a first group of described embodiments, a computer (such as a cloud-based computer) provides an SVPN with one or more preconfigured digital wallets for a first user in the SVPN. Notably, the computer may execute a virtual machine that provides a container for the SVPN of the first user, and the first electronic device associated with the first user may execute an instance of an application that facilitates secure communication in the SVPN and/or conducting of one or more distributed secure transactions (such as a blockchain transaction and, more generally, a transaction associated with a cryptocurrency or an NFT) via the SVPN (and, more generally, via the SVPN and/or another network). For example, the first electronic device may store a set of first encryption keys, which allows the first electronic device to securely communicate via the SVPN. Moreover, the virtual machine may provide a container for the SVPN of the first user. This container may include the one or more preconfigured digital wallets associated with the first user, where a given preconfigured digital wallet includes cryptographic keys and a distributed ledger (such as a blockchain) for use in conducting the one or more distributed secure transactions. Note that the one or more preconfigured digital wallets may enable the first electronic device to process or perform the one or more distributed secure transactions. Alternatively, the one or more preconfigured digital wallets may enable the first electronic device to perform the one or more distributed secure transactions in a second computer via the SVPN (and, more generally, via the SVPN and/or the other network).

By provisioning the first electronic device, these communication techniques may allow the first user in the SVPN to establish a cryptographic node (such as a blockchain node). Notably, the communication techniques may reduce the time, effort and cost of establishing a cryptographic node. Moreover, the communication techniques may eliminate the need for a user to engage the services of a cryptographic-node service provider. Furthermore, the communication techniques may allow the first user in the SVPN conduct the one or more distributed secure transactions. Notably, the first user may use the one or more preconfigured digital wallets to conduct the one or more distributed secure transactions in the SVPN and/or the other network. Additionally, the SVPN may allow the first user to exchange content in a controlled manner during the one or more distributed secure transactions. These capabilities may allow the first user to avoid the problems associated with existing cryptographic networks. Consequently, the communication techniques may improve the user experience when using the first electronic device and/or the computer, conducting the one or more distributed secure transactions and/or exchanging content with another computer or another electronic device in the SVPN.

In a second group of embodiments, a computer (such as a cloud-based computer) provides one or more verified personas for a distributed token (such as an NFT) of a first user. For example, the first user's identity may be known to the provider of the SVPN, such as via their account(s) with the provider of the SVPN. However, the first user may be able to define the one or more verified personas that are associated with their account(s) with the provider of the SVPN. The one or more verified personas may obfuscate the known identity of the first user when conducting one or more discrete secure transactions (such as a blockchain transaction and, more generally, a transaction associated with a cryptocurrency or the NFT) using or associated with the distributed token. Notably, the first user may associate or link the one or more verified personas with the distributed token of the first user. This may allow the first user the benefits and privacy of selectively making themselves anonymous (and controlling what information about themselves is made public), while offering the protection of being able to identify the first user when needed (such as to prevent fraudulent, unwanted, criminal or dangerous activity during the one or more discrete secure transactions.

By associating the one or more verified personas with the distributed token, these communication techniques may provide the security of an valid and identifiable owner of the distributed token, while maintaining the external anonymity (and, thus, privacy) of the first user. These capabilities may improve the security and trustworthiness of the one or more distributed secure transactions, while reducing the threat of criminal activity or unwanted attention for the first user. Consequently, the communication techniques may improve the user experience when using the first electronic device and/or the computer, conducting the one or more distributed secure transactions and/or exchanging content (such as content associated with the distributed token) with another computer or another electronic device in the SVPN.

In the discussion that follows electronic devices and computers may include radios or, more generally, network interfaces that communicate packets or frames in accordance with one or more communication protocols, such as: an Institute of Electrical and Electronics Engineers (IEEE) 802.11 standard (which is sometimes referred to as WiFi®, from the WiFi® Alliance of Austin, Texas), Bluetooth™ (from the Bluetooth Special Interest Group of Kirkland, Washington), a cellular-telephone communication protocol, another type of wireless interface, a wired network communication protocol (e.g., Ethernet, Ethernet II or an IEEE 802.3 standard, which are individually or collectively henceforth referred to as 'Ethernet') and/or another network communication protocol. For example, the cellular-telephone communication protocol may include or may be compatible with: a $2^{nd}$ generation or mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used. In addition, the communication may occur via a wide variety of frequency bands. In the discussion that follows, Ethernet (which is sometimes referred to as a 'non-wireless communication technique' or protocol) is used as an illustrative example.

Communication among electronic devices is shown in FIG. 1, which presents a block diagram illustrating a system 100 that includes electronic devices 110 (such as a computer, a portable electronic device, a cellular telephone, a tablet computer, etc., which are sometimes referred to as a 'group of electronic devices'), computer 112 (such as a cloud-based computer or server, which may be included in a distributed computer system) and optional enrollment computer 114 that communicate with each other using wired (or non-wireless communication) via network 116 (such as the Internet) and/or optional wireless communication via a cellular-telephone network 106 (e.g., via an optional base station 118), a wireless local area network (e.g., via an optional access point 120) and/or a another wireless communication technique.

As described further below with reference to FIGS. 8-9, computer 112 may provide an SVPN for a first user of at least one of electronic devices (such as electronic device 110-1) that has master privileges in the SVPN, which may allow electronic device 110-1 to be used to invite another user (such as the second user) to join the SVPN. Notably, the SVPN may be of or for the first user, while other users of a remainder of electronic devices 110 (such as a second user of electronic device 110-2) may have guest privileges in the SVPN of the first user (i.e., the other users may be guests in the SVPN of the first user). (However, in some embodiments, the first user may define or specify that two or more of electronic devices 110 have master privileges in the SVPN.) The SVPN may be provided by computer 112 by executing a virtual machine that provides a container for the SVPN of the first user, and electronic devices 110 may execute instances of an application that facilitates secure communication in the SVPN. Note that computer 112 may execute different virtual machines that provide separate containers for other SVPNs that are independent of the SVPN. For example, computer 112 may host up to N independent SVPNs, where N is an integer that is greater than zero.

Moreover, electronic device 110-1 may store a set of first encryption keys (with one or more encryption keys) and electronic device 110-2 may store a set of second encryption keys (with one or more encryption keys), which allow electronic devices 110-1 and 110-2 to securely communicate at least with each other via the SVPN. For example, a given encryption key may be: a symmetric encryption key, an asymmetric encryption key (such as public and a private encryption keys) and/or an encryption key that is derived from or based at least in part on another encryption key (such as a symmetric encryption key that is encrypted using a public encryption key). Note that computer 112 may not be able to access the set of first encryption keys or the set of second encryption keys. Furthermore, the container may include information, such as locations or network addresses (e.g., an IP address, or equivalently a fully qualified domain name, and a communication port), that allow computer 112 to facilitate the secure communication between electronic devices 110 over or via network 116 without the assistance of another computer in network 116. Alternatively, the locations or network addresses may be distributed and stored in electronic devices 110.

During operation, electronic device 110-1 may receive content or information from the first user. For example, the content may include: text, audio, music, photographs, video, presentations, documents, etc. In some embodiments, the content includes embedded content, such as a pointer or a link to a location where the content can be accessed. In response, electronic device 110-1 may use at least a first encryption key in the set of first encryption keys to generate a first secure message for electronic device 110-2. Then, electronic device 110-1 may transmit or provide the first secure message, via the optional base station 118 and/or the optional access point 120, and network 116, to computer 112. After receiving the first secure message, computer 112 may use the information in the container (such as the location or network address of electronic device 110-2) to route or forward the first secure message to electronic device 110-2 via networks(s) 116 (which may involve wired and/or wireless communication).

After receiving the first secure message, electronic device 110-2 may use at least a second encryption key in the set of second encryption keys to decrypt the first secure message. Next, electronic device 110-2 may receive content from the second user. In response, electronic device 110-2 may use at least the second encryption key to generate a second secure message for electronic device 110-1. Then, electronic device 110-2 may transmit or provide the second secure message, via network 116, to computer 112. After receiving the second secure message, computer 112 may use the information in the container (such as the location or network address of electronic device 110-1) to route or forward the second secure message to electronic device 110-1 via networks(s) 116, the optional base station 118 and/or the optional access point 120.

In these ways, the communication techniques may be used to provide secure communication, which allows the users of the SVPN to reduce or eliminate (and, more generally, control) access to their content by third parties for purposes of marketing, advertising and/or data mining.

Furthermore, as described further below with reference to FIGS. 2-7, the first user may interact with computer 112 and/or the optional enrollment computer 114 to establish an account with a provider of the SVPN, to establish the SVPN on computer 112 and to invite other users (such as the second user) to join the SVPN. For example, the first user may remotely interact with computer 112 and/or the optional enrollment computer 114 via a secure Web-Browser interface.

As described further below with reference to FIGS. 10-11, in some embodiments the first user may also use an optional local computer 122 that has similar capabilities to computer 112 (as well as optional additional capabilities, such as the ability to function as a router or access point in a wireless local area network). For example, the optional local computer 122 may be owned and located at the first user's home or business (and, more generally, in an environment of or associated with the first user). In these embodiments, computer 112 may provide back-up and failover redundancy for the optional local computer 122. For example, computer 112 may copy at least some of the information on the optional local computer 122 after a mirroring time interval (such as a few minutes) has elapsed. Moreover, in the event of failure of the optional local computer 122 (such as a power or network failure at a location of or proximate to the optional local computer 122), computer 112 may step in to provide or facilitate the SVPN. When the optional local computer 122 is available again, local computer 112 may notify, via network 116, computer 112 and/or electronic devices 110 in the SVPN, so that communication traffic in the SVPN is routed or sent directly to the optional local computer 122 again. Alternatively, in some embodiments, all secure messages or traffic in the SVPN may be routed through computer 112, which, when the optional local computer 122 is operating or available, may then route traffic for electronic device 110-1 through or via the optional local computer 122. Note that computer 112 and the optional local computer 122 may communicate or ping each other regularly (such as a after a proof-of-life time interval of a few minutes), so that computer 112 can confirm that the optional local computer 122 is available.

Figure 12:
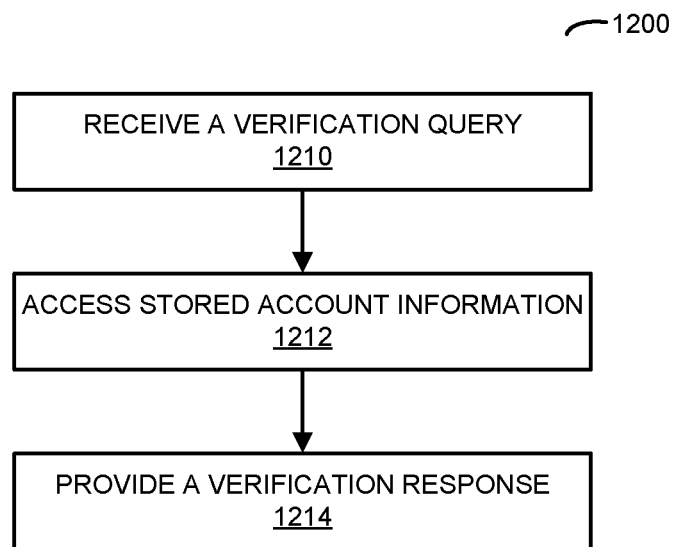
FIG. 12 is a flow diagram illustrating an example method for providing a verified persona in accordance with an embodiment of the present disclosure.

Additionally, as described further below with reference to FIGS. 12-13, the first user and/or the other users in the SVPN may be verified users. Notably, a provider of the SVPN (who may be different from a provider of computer 112 and/or the optional local computer 122) may verify and, thus, may known identities of the first user and/or the other users in the SVPN based at least in part on billing information associated with the accounts with the provider of the SVPN. This capability may allow computer 112 to facilitate improved interaction among the first user and/or the other users in the SVPN in applications within the SVPN (such as a chat application) or in applications outside of the SVPN. For example, a user (such as the first user) may define one or more verified personas that allow the user to login or access a social network from a different provider than the provider of the SVPN via computer 112. For example, the social network may be hosted by computer 128. Note that a given persona may be verified, in the sense that it confirms that the identity of the user is in principle known, but still may allow the user to keep their identity in the social network secret or anonymous (unless special circumstances dictate that the user's identity needs to be determined). In this way, the user may selectively control the information about themselves that is made public when they access or use the social network.

As noted previous, in some embodiments communication among components in system 100 involves wireless communication. During the wireless communication, electronic devices 110, the optional base station 118, the optional access point 120 and/or the optional local computer 122 may: transmit advertising frames on wireless channels, detect one another by scanning wireless channels, establish wireless connections (for example, by transmitting association requests), and/or transmit and receive packets or frames (which may include the association requests and/or additional information as payloads, such as secure messages with content or pointers to locations where the content can be accessed, etc.). Moreover, during the wired communication, electronic devices 110, computer 112, the optional enrollment computer 114 and/or the optional local computer 122 may receive packets or frames using a wired communication technique or protocol (e.g., Ethernet II or an IEEE 802.3 standard). In some embodiments, the optional local computer 122 may convert packets or frames that are received using the wired communication technique to a WLAN communication technique or protocol (such as an IEEE 802.11 standard or an LTE standard), and may wirelessly transmit the packets or frames. Similarly, the optional local computer 122 may: receive packets or frames using the WLAN communication technique; convert the packets or frames to the wired communication technique; and transmit the packets or frames. Thus, the optional local computer 122 may perform the functions of an access point.

As described further below with reference to FIG. 18, electronic devices 110, computer 112, the optional enrollment computer 114, the optional base station 118, the optional access point 120 and/or the optional local computer 122 may include subsystems, such as: a networking subsystem, a memory subsystem and a processor subsystem. In addition, electronic devices 110, the optional base station 118, the optional access point 120 and/or the optional local computer 122 may include radios 124 in the networking subsystems. (Note that radios 124 may be instances of the same radio or may be different from each other.) More generally, electronic devices 110, computer 112, the optional enrollment computer 114, the optional base station 118, the optional access point 120 and/or the optional local computer 122 can include (or can be included within) any electronic devices with the networking subsystems that enable electronic devices 110, computer 112, the optional enrollment computer 114, the optional base station 118, the optional access point 120 and/or the optional local computer 122 to communicate with each other using wired communication (e.g., a non-wireless communication technique) and/or optional wireless communication. The optional wireless communication can comprise transmitting advertisements on wireless channels to enable electronic devices to make initial contact or detect each other, followed by exchanging subsequent data/management frames (such as association requests and responses) to establish a wireless connection, configure security options (e.g., Internet Protocol Security), and transmit and receive packets or frames via the wireless connection, etc.

As can be seen in FIG. 1, wireless signals 126 (represented by a jagged line) are optionally transmitted from radio 124-1 in electronic device 110-1. These wireless signals are optionally received by at least the optional access point 120. Notably, electronic device 110-1 may optionally transmit packets. In turn, these packets may be optionally received by a radio 124-2 in the optional access point 120. This may allow electronic device 110-1 to wirelessly communicate information to the optional access point 120. While FIG. 1 illustrates electronic device 110-1 transmitting packets, note that electronic device 110-1 may also receive packets from the optional access point 120.

In the described embodiments, processing of a packet or frame in electronic devices 110, the optional base station 118, the optional access point 120 and/or the optional local computer 122 includes: receiving signals (such as wireless signals 126) with the packet or frame; decoding/extracting the packet or frame from the received signals to acquire the packet or frame; and processing the packet or frame to determine information contained in the packet or frame (such as the information or content associated with or included in a secure message).

Note that the communication among electronic devices 110, computer 112, the optional enrollment computer 114, the optional base station 118, the optional access point 120 and/or the optional local computer 122 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization').

In these ways, the communication techniques may provide a robust SVPN that the users can user to communicate with each other while protecting their privacy and the privacy of the information they exchange via the SVPN.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While electronic devices 110 and optional access point 120 are illustrated with a single instance of radios 124, in other embodiments electronic devices 110, optional access point 120 and/or another component in system 100 may include multiple radios.

Figure 2:
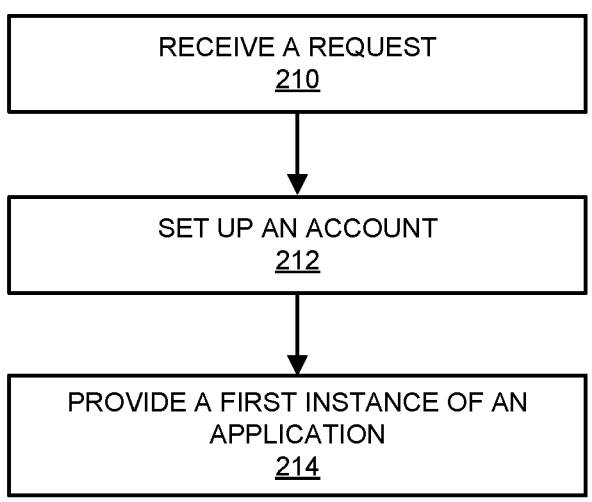
FIG. 2 is a flow diagram illustrating an example method for establishing an account with a provider of a secure, virtual personalized network (SVPN) in accordance with an embodiment of the present disclosure.

FIG. 2 presents a flow diagram illustrating an example method 200 for establishing an account with a provider of an SVPN, which may be performed by a computer (such as computer 112 and/or optional enrollment computer 114 in FIG. 1). During operation, the computer may receive a request (operation 210) from a first electronic device associated with a first user. In response to the request, the computer may set up the account (operation 212) for the first user (assuming that the first user does not already have an account). When setting up the account, information may be exchanged with the first electronic device. For example, the computer may ask for and, in response, may receive answers to the questions, such as billing information of the first user. Note that the billing information may include bank information or information that specifies a debit card or a credit card of the first user. As described further below, the billing information may be used to verify the first user, such as to confirm their identity and that he or she is, in fact, a real person. Thus, in the SVPN, the first user may have an identity that is known to a provider of the SVPN (such as a provider of an SVPN service that is hosted on the computer).

Next, the computer may provide a first instance of an application (operation 214), e.g., software with program instructions, to the first electronic device. This may include providing a link or information that specifies a location of the link. When activated by the first user or when the first user navigates to the link, the first instance of the application may be downloaded to the first electronic device. Alternatively, the first instance of the application may be downloaded to the first electronic device automatically during method 200. For example, the application may include installation program instructions. As described further below, this first instance of the application may provide master privileges to the first user in an SVPN of the first user, such as the ability to invite guests (such as friends, colleagues or family members) to join the SVPN.

Figure 3:
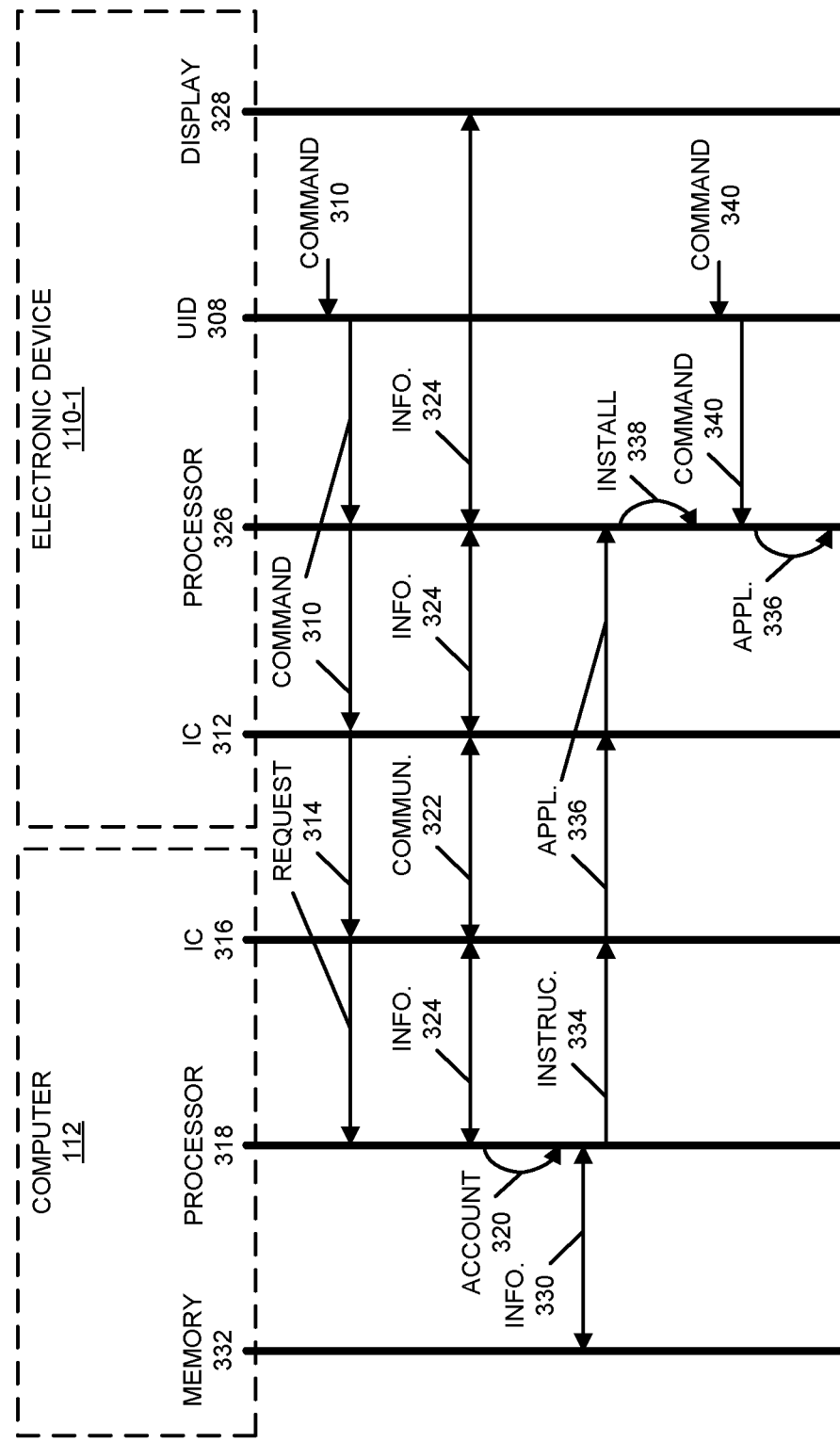
FIG. 3 is a drawing illustrating an example of communication among the electronic devices in FIG. 1 in accordance with an embodiment of the present disclosure.

FIG. 3 presents a drawing illustrating an example of communication between electronic device 110-1 and computer 112 (and/or optional enrollment computer 114). Based at least in part on an instruction or a command 310 received from the first user using a user-interface device (UID) 308 in electronic device 110-1 (such as a mouse, a keyboard, a voice-recognition device, a trackpad, another user-interface device, a touch-sensitive display, etc.), a processor 326 in electronic device 110-1 may instruct an interface circuit (IC) 312 in electronic device 110-1 to provide a request 314 to computer 112 (such as in a packet or a frame).

After receiving request 314, interface circuit 316 in computer 112 may provide request 314 to processor 318. In response, processor 318 may set up an account 320 for the first user. This may involve bidirectional communication 322, via interface circuits 312 and 316, of information 324 with the first user, which is presented to the first user by processor 326 and, e.g., a display 328 in electronic device 110-1. Note that when setting up account 320, processor 318 may store account information 330 in memory 332 in computer 112.

Next, processor 318 may instruct 334 interface circuit 316 to provide a first instance of an application 336 to electronic device 110-1. After receiving application 336, processor 326 may install 338 application 336. In response to an instruction or a command 340 received from the first user using user-interface device 308, processor 326 may execute application 336 (such as in the context of an environment on electronic device 110-1, e.g., in an operating system of electronic device 110-1).

Figure 4:
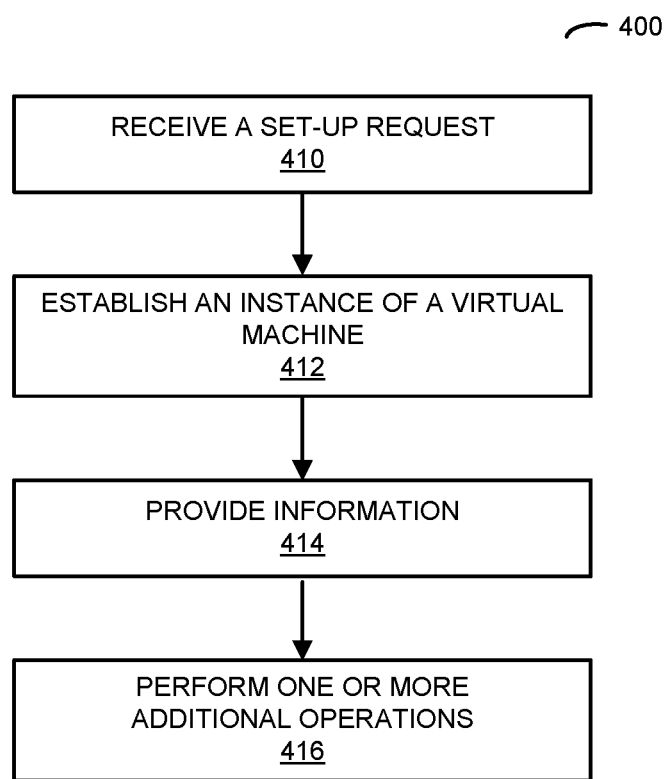
FIG. 4 is a flow diagram illustrating an example method for establishing an SVPN in accordance with an embodiment of the present disclosure.

FIG. 4 presents a flow diagram illustrating an example method 400 for establishing or providing an SVPN, which may be performed by a computer (such as computer 112 in FIG. 1). During operation, the computer may receive a set-up request (operation 410), e.g., from a first electronic device associated with a first user or from a program module or instructions executed by the computer. This set-up request may be the same as or different from the request in method 200 (FIG. 2). For example, in embodiments where the computer sets up the account, the set-up request may be provided by the program module or instructions while or after the account of the first user is set up (assuming that the first user does not already have an account). In some embodiments, the set-up request is received from the optional enrollment computer, which may set up the account and provide the first instance of the application in method 200 (FIG. 2).

Alternatively, after the application is installed on the first electronic device (following the operations in method 200 in FIG. 2), the first user may launch or activate the application. When this occurs for the first time, the application may provide the set-up request to the computer. However, in some embodiments, there may be a single request provide by the first user using the first electronic device. In response to this request, the account for the first user may be set up (via the operations in method 200 in FIG. 2) and the operations in method 400 may be performed. Thus, the set-up request may occur when the account with the provider of the SVPN is established for the first user and a first instance of an application associated with the SVPN is provided to and/or installed on the first electronic device.

In response to the set-up request, the computer may establish or create an instance of a virtual machine (operation 412) that provides a container for the SVPN of the first user. This container may include executable package of software that includes everything needed to run the SVPN, including: SVPN code, a runtime executable or compiled SVPN code, tools, libraries and settings. Moreover, memory and processing resources associated with the container may be self-contained and independent of any other virtual machines, process and/or applications on the computer. Therefore, the virtual machine provides a self-contained operating system or environment in which the SVPN executes independently of other virtual machines, process and/or applications on the computer. As described further below, the SVPN may allow the first electronic device to communicate securely with a group of electronic devices associated with other users and which may include one or more electronic devices. Note that the electronic devices in the group, as well as the first electronic device, may be remotely located from the computer.

In some embodiments, the computer may be included in a distributed computer system, which may include two or more computers that each implement an instance of program instructions for the SVPN (and, thus, which each may include a duplicate instance of the virtual machine container), thereby providing failover redundancy. For example, the computer may provide the SVPN as a cloud-based service that is accessed by the group of electronic devices via a network, such as the Internet. Note that a provider of the computer or the computer system may be different from the provider of the SVPN.

Moreover, the computer may provide information (operation 414) that can be used to generate a set of first encryption keys to the first electronic device. (Alternatively, the information may be provided when the first application is provided to the first electronic device in method 200 in FIG. 2.)

As described further below, these set of first encryption keys (which may include one or more encryption keys) may be used by the first instance of the application to encrypt or de-encrypt secure messages with content or information that are communicated in the SVPN with at least a subset of the group of other electronic devices.

For example, the information may include a first token that is used by the first electronic device (such as the first instance of the application) to generate the set of first encryption keys. Notably, the first token may include or may specify a generating function for the set of first encryption keys. However, in some embodiments, the computer may generate or select the set of first encryption keys, and then may provide the set of first encryption keys to the first electronic device.

Note that the set of first encryption keys may not be stored in the memory and the computer may not be able to access the set of first encryption keys. This may ensure that the users of the SVPN (such as the first user) have exclusive control over who can via the content or the information in the secure messages that are communicated in the SVPN. Stated differently, neither the provider of the SVPN service nor the operator or provider of the computer that hosts the SVPN (which may be different from the provider of the SVPN) may be able to access or de-encrypt the secure messages that are communicated in the SVPN.

In some embodiments, in order to provide redundancy to the set of first encryption keys on the first electronic device, the first user of the electronic device may store the set of first encryption keys in off-line memory (such as a USB memory stick). Alternatively or additionally, as described further below, in some embodiments the first user may have more than one electronic device that has master privileges and that stores or has access to the set of first encryption keys.

As part of establishing the virtual machine with the container (operation 412), the computer may establish a maintained association with the first electronic device in the SVPN. For example, maintaining a pre-established association may include storing in memory on the computer the location or network address of the first electronic device (such as an IP address, or equivalently a fully qualified domain name, and a communication port). In turn, another component in the SVPN (such as the first electronic device) may maintain a pre-establish a counterpart association with the computer. In the discussion that follows, a 'maintained association' includes locations that allow a given electronic device or the computer to establish a dynamic 'connection' (such as a connection using a TCP/IP protocol), which allows the given electronic device or the computer to securely communicate content or information in the SVPN.

Thus, the container in the computer may include the information (such as the locations or network addresses) needed to route communication between the first electronic device and the group of electronic devices based at least in part on established and long-lived associations in the SVPN (and without assistance of another computer in the network) that convey the communication among the first electronic device, the computer and the group of electronic devices via at least a non-wireless communication technique, such as Ethernet. Note that the computer may support up to N SVPNs of N users, where N is a non-zero, positive integer and the N SVPNs have separate containers and are independent of each other. While electronic devices in the group of electronic devices may be included in more than one SVPN, the communication within an SVPN may be independent of the communication in another SVPN.

In some embodiments, the computer optionally performs one or more additional operations (operation 416). For example, components in the SVPN (such as the first electronic device or the computer) may also maintain the associations by updating each other regarding any changes to the locations of any of the electronic devices or the computer (such as a change to an IP address, or equivalently a change to a fully qualified domain name, and/or a change to a communication port). As an analogy, the components in the SVPN may each function as their own personal Domain Name System, so that the SVPN is distributed and is not dependent on location information that is centrally stored in a network (such as network 116 in FIG. 1) and, thus, is less vulnerable to tampering, denial of service attacks, etc.

When communication of a secure message fails (e.g., when a given electronic device in the group of electronic devices or the computer does not receive an acknowledgment from a recipient electronic device in the group of electronic devices within an allotted time interval), a given electronic device or the computer may perform an optional remedial action to determine or detect a change to a location in a network (such as network 116 in FIG. 1) of, e.g., another electronic device in the group of electronic devices. Then, the given electronic device (such as the first electronic device) or the computer may communicate a secure message with an update to the location (which is encrypted using an encryption key in the set of first encryption keys of the first user or a compatible encryption key, such as a public encryption key) to the group of electronic devices in the SVPN.

The remedial action may include a variety of techniques that detect the change in the location, such as: poking a hole through a firewall to determine the IP address of another electronic device (such as a second electronic device) in the SVPN; connecting to a point in a network (such as network 116 in FIG. 1) and then tracing the route back to the other electronic device (e.g., the first external IP address may be the IP address of the other electronic device); asking a server to find the IP address of the other electronic device; asking a router to provide the IP address of the other electronic device; asking a third-party service to determine the IP address of the other electronic device; and/or, if a network (such as network 116 in FIG. 1) is a public network (such as the Internet), determining the IP address of the other electronic device. In some embodiments, the change in the location is detected using: a Network Addressing Translation-Port Mapping protocol, a Universal Plug and Play protocol, and/or a Hairpin Network Addressing Translation protocol. Note that the update(s) may be provided via the SVPN and/or or a different communication channel than the SVPN (such as via email or a text message). In some embodiments, the update is communicated to the users of the SVPN by a third party, who is other than one of the users.

If communication of a secure message with the update to the location of one of the electronic devices in the group of electronic devices or the computer fails, the first electronic device or the computer may provide may provide a secure message with the update to the location to a trusted computer or server in a network (such as network 116 in FIG. 1). Then, other components in the SVPN (such as the group of electronic devices) may access this secure message with the update on the trusted computer. In this way, the group of electronic devices may obtain updates to the locations even if one or more of the electronic devices or the computer are temporarily unable to communicate with each other (such as when there is a power failure). Alternatively or additionally, if communication with one of the electronic devices in the group of electronic devices fails for a time interval (such as 1 min, 10 min, 30 min, 1 hr., etc.), the first electronic device may access the trusted computer in the network and may obtain a secure message with an update to a location of another electronic device or the computer (which may be encrypted using the encryption key of another user in the SVPN) that was posted by one or more of the electronic devices in the group of electronic devices or the computer and that is stored on the trusted computer.

In some embodiments, if communication with one of electronic devices in the group of electronic devices fails for the time interval, the first electronic device or the computer may poll one of more of the other electronic devices in the group of electronic devices to determine an update to the location of this electronic device. Notably, in response to update requests from the first electronic device or the computer, the other electronic devices in the group of electronic devices may provide the location information of a 'lost' electronic device in the group of electronic devices that is stored or included in the pre-established and maintained associations. Then, the first electronic device or the computer may use the location specified in the location information from the majority of the electronic devices in the group of electronic devices, or the first electronic device or the computer may try all of the locations in the location information received from the other electronic devices in the group of electronic devices in order to re-establish secure communication.

In some embodiments, one or more authentication techniques may be used to improve security in the SVPN. For example, when the computer establishes or generates the virtual machine for the contain for the SVPN or when the first instance of the application is provided to the first electronic device, the computer may generate a first device-access key (or may select and assign a predetermined device-access key) that is specific to the first electronic device, and may provide or communicate the first device-access key to the first electronic device. Subsequently, when the first user attempts to access the SVPN using the first electronic device (such as via the first instance of the application that is installed on and that executes on the first electronic device), the first electronic device may use the first device-access key to authenticate with the computer. Note that the first device-access key may include an asymmetric key, such as a secure-shell public encryption key.

Moreover, in some embodiments the first instances of the application executed by first electronic device may be authenticated, thereby adding another layer of security in the communication techniques. For example, the computer may provide (such as every 30 min, hour or six hours) a challenge (such as a random or a pseudorandom number) to the first electronic device. In response, the first electronic device may respond by providing an encoded version of the challenge to the computer. The encoded version of the challenge may be generated using an authentication module or instructions in the first instance of the application executed by the first electronic device. After receiving the encoded version of the challenge, the computer may compare a second encoded version of the challenge (which was generated using an instance of an authentication module executed by the computer) to confirm that they are the same, and thus, associated with the provider of the SVPN.

For example, a given authentication module may use a hash function (such as SHA-256) and an identification number that is specific to a given instance of the application to generate a given encoded version of a challenge. The computer may have the identification numbers for the instances of the application on the group of electronic devices in the SVPN (e.g., these identification numbers may be exchanged during the invitation process described further below with reference to FIGS. 6-7), and the computer may generate multiple other encoded versions of the challenge using the different identification numbers to confirm that one of the other encoded versions of the challenge matches the encoded version of the challenge received from the given electronic device. (Note that the use of the identification number may prevent an instance of the application being used to provide encoded versions of a challenge to other electronic devices that are not associated with the provider of the SVPN. For example, each of the instances of the application may maintain a 'white list' of allowed identification numbers or a 'black list' of non-allowed identification numbers, and the white list and/or the black list may be regularly updated by the computer or by a provider of the SVPN.) More generally, the authentication module may implement a coding technique (such as an encryption technique). In some embodiments, the instances of the authentication module include a set of coding techniques (such as 32 different hash functions) and, at any given time, a common setting that specifies one of the coding techniques may be distributed to the instances of the application executed by the group of electronic devices in the SVPN so that they all use the same coding technique in their instances of the authentication module. Thus, the authentication module may be used to authenticate an instance of the application executing on a given electronic device.

Furthermore, in some embodiments, the first user can add one or more additional electronic devices to the SVPN, and which as associated with the account of the first user. As with the first electronic device, the one or more additional electronic devices may have master privileges in the SVPN. The one or more additional electronic devices may have access to the set of first encryption keys. For example, when the first user adds the one or more additional electronic devices to the SVPN, the first electronic device may provide the set of first encryption keys or information that specifies the set of first encryption keys (such as the first token or another token) to the one or more additional electronic devices. Alternatively, in response to a add request received from the first electronic device, the computer may generate or select and provide the other token to the first electronic device. Then, the first electronic device may forward the other token and the location of the computer (such as an IP address, or equivalently a fully qualified domain name, and a communication port) to one of the one or more additional electronic devices. Moreover, after receiving the other token, this other electronic device may submit the other token to the computer. If the computer determines that the other token is valid, the computer may generate another device-access key (or may assign another predetermined device-access key) that is specific to the other electronic device, and may provide or communicate the other device-access key to the other electronic device. This other device-access key may authenticate the other electronic device to the computer when the use attempts to access the SVPN using the other electronic device.

Figure 5:
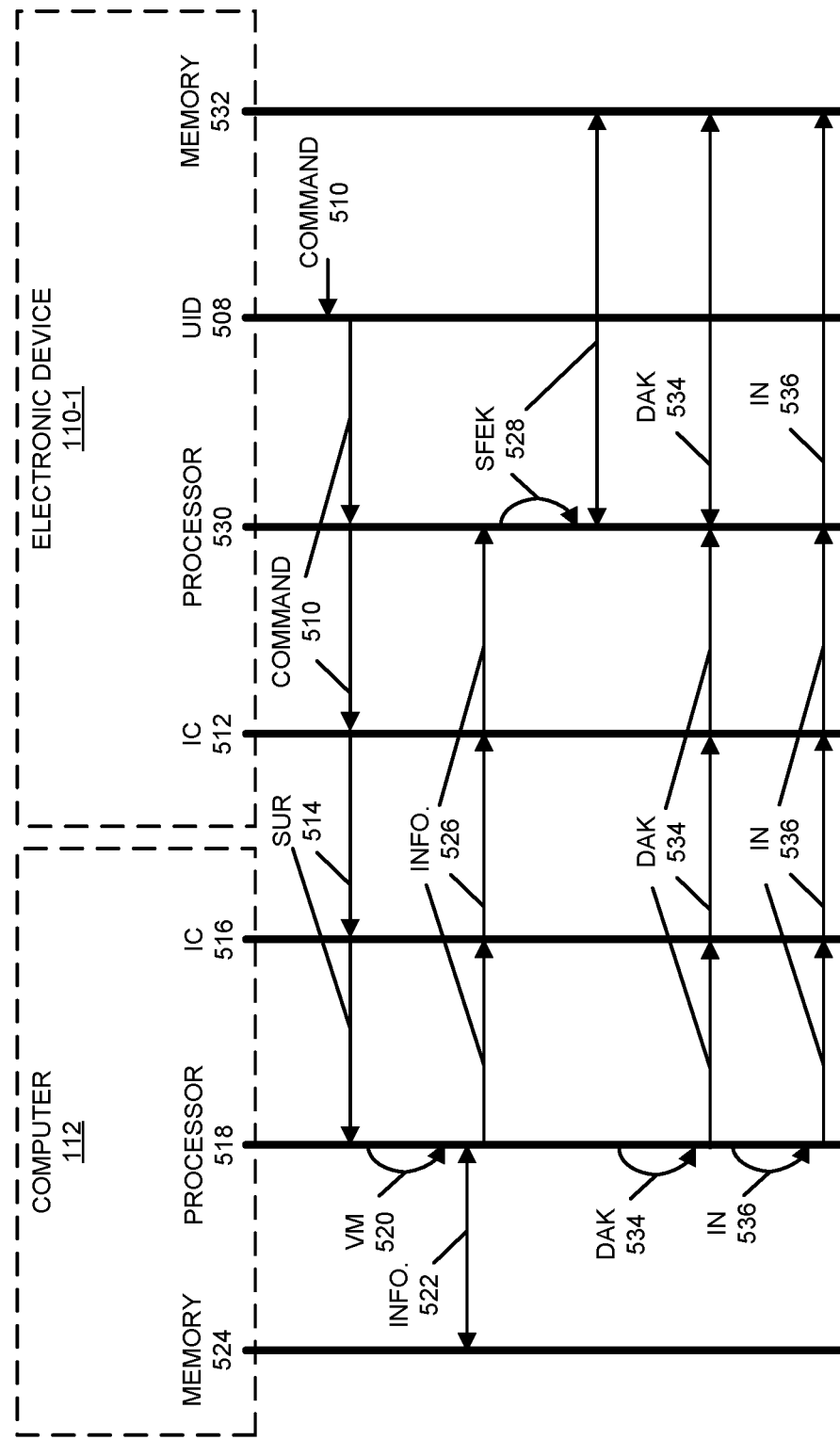
FIG. 5 is a drawing illustrating an example of communication among the electronic devices in FIG. 1 in accordance with an embodiment of the present disclosure.

FIG. 5 presents a drawing illustrating an example of communication between electronic device 110-1 and computer 112. Based at least in part on an instruction or a command 510 received from the first user using a user-interface device 508 in electronic device 110-1 (such as a mouse, a keyboard, a voice-recognition device, a trackpad, another user-interface device, a touch-sensitive display, etc.), processor 530 in electronic device 110-1 may instruct an interface circuit 512 in electronic device 110-1 to provide a set-up request (SUR) 514 to computer 112.

After receiving request 514, interface circuit 516 in computer 112 may provide set-up request 514 to processor 518. In response, processor 518 may establish a virtual machine (VM) 520 that provides a container for an SVPN for the first user, including storing associated information 522 in memory 524 in computer 112.

Then, processor 518 may provide information 526 to electronic device 110-1 via interface circuit 516. This information can be used to generate a set of first encryption keys 528. (Alternatively, processor 518 may select and provide a predetermined set of encryption keys in memory 524.) After receiving information 526, interface circuit 510 may provide information 526 to processor 530, which uses information 526 to generate the set of first encryption keys (SFEK) 528. Next, processor 530 may store the set of first encryption keys 528 in memory 532 in electronic device 110-1.

Moreover, processor 518 may generate device-access key (DAK) 534, which is provided to electronic device 110-1 via interface circuits 516 and 512. Furthermore, processor 530 may store device-access key 534 in memory 532. In some embodiments, processor 530 provides an identification number (IN) 536 of the first instance of the application 336 to electronic device 110-1 via interface circuits 516 and 512. This identification number may be stored by processor 530 in memory 532.

Figure 6:
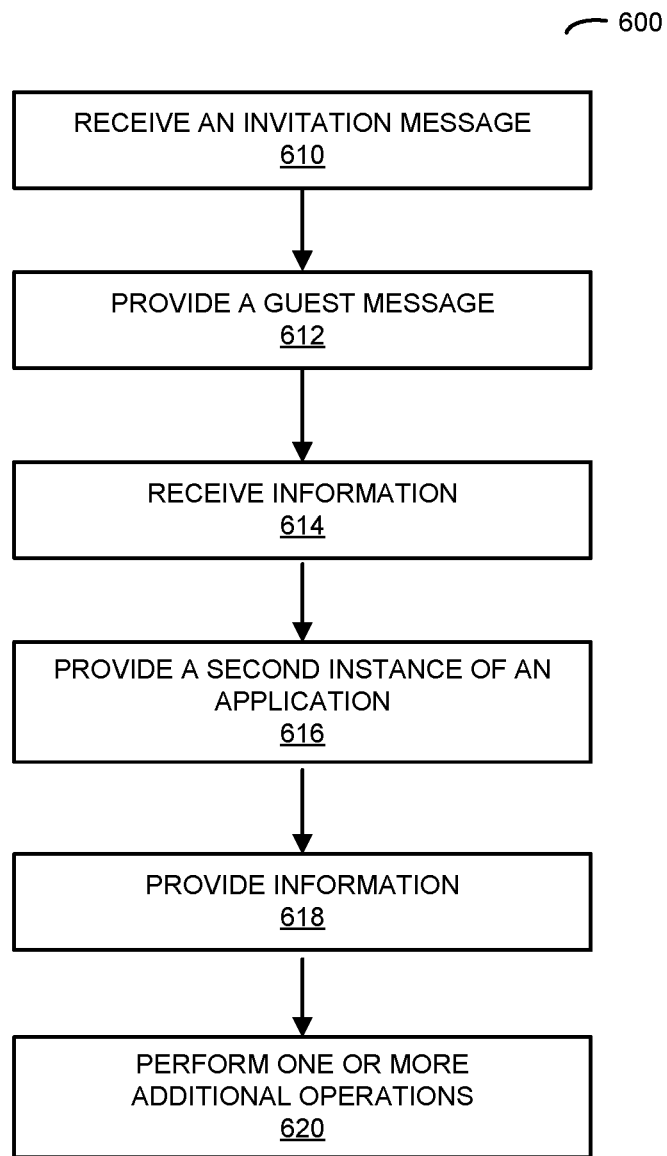
FIG. 6 is a flow diagram illustrating an example method for inviting a user to join an SVPN in accordance with an embodiment of the present disclosure.

FIG. 6 presents a flow diagram illustrating an example method 600 for inviting a user to join an SVPN, which may be performed by a computer (such as computer 112 in FIG. 1). During operation, the computer may receive an invitation message (operation 610), e.g., from a first electronic device associated with a first user, which includes an address associated with a second user. For example, the first user may use a first instance of an application executing on the first electronic device to generate the invitation message. In some embodiments, the first user may provide the address (such as an email address or a telephone number) of the second user that the first user wants to invite to join the SVPN, e.g., by accessing contact information in an address book (such as an address book associated with an email application or a contact list associated with a telephone or a communication application).

In response to the invitation message, the computer may provide a guest message (operation 612) to the address that invites the second user to join the SVPN of the first user and that includes a link or information specifying the link to join the SVPN of the first user. For example, the computer may communicate the guest message to the address via a server than manages a communication account of the second user (such as an email server) using a different communication channel than the SVPN (e.g., via out-of-band communication, such as an email or a text message). Alternatively, the computer may provide the guest message to the first electronic device, which then provides the guest message to the address.

Then, in response to receiving information (operation 614) specifying activation of or navigation to the link (such as if the second user clicks on or activates the link, which indicates acceptance of the invitation), the computer may provide, to a second electronic device associated with the second user, a second instance of the application (operation 616) associated with the SVPN that provides guest privileges in the SVPN of the first user, and thus allows the second user to join the SVPN of the first user. Note that, in some embodiments, receiving the information specifying activation of or navigation to the link may involve communication via an out-of-band communication channel and/or a different communication technique that is or are associated with or used in the SVPN.

When or after the second instance of the application is provided to the second electronic device, the computer may provide information (operation 618) to the second electronic device that can be used to generate a set of second encryption keys (such as a second token), which may include one or more encryption keys. For example, the second token may include or may specify a generating function that is used by the second electronic device (such as the second instance of the application) to generate the set of second encryption keys. However, in some embodiments, the computer may generate or select the set of second encryption keys, and then may provide the set of second encryption keys to the second electronic device. The set of second encryption keys may include at least a second encryption key that is a counterpart to at least one encryption key in the set of first encryption keys that is reserved for communication between the first electronic device and at least the second electronic device, and which allow the second electronic device to communicate secure messages only with other electronic devices in the SVPN (such as the first electronic device or at least a subset of the group of electronic devices). Notably, the second encryption key may include a public encryption key of the first user. In some embodiments, the second encryption key is included in a key chain with the set of first encryption keys.

Note that the set of second encryption keys may not be stored in memory of the computer and the computer may not be able to access the set of second encryption keys. This may ensure that the users of the SVPN (such as the second user) have exclusive control over who can via the content or the information in the secure messages that are communicated in the SVPN. Stated differently, neither the provider of the SVPN service nor the operator or provider of the computer that hosts the SVPN may be able to access or de-encrypt the secure messages that are communicated in the SVPN.

In some embodiments, the computer may optionally perform one or more additional operations (operation 620). Notably, when the computer receives the information specifying the activation of or navigation to the link, the computer may receive the location or network address of the second electronic device (such as an IP address, or equivalently a fully qualified domain name, and a communication port), which the computer may use to establish a maintained association with the second electronic device in the SVPN. For example, maintaining a pre-established association may include storing in memory on the computer the location or network address of the second electronic device. In turn, when the second instance of the application is provided to the second electronic device, the computer may provide its location or network address, which the second electronic device may use to maintain a pre-establish a counterpart association with the computer.

In some embodiments, when or after the second instance of the application is provided to the second electronic device, the computer may generate a second device-access key (or may select and assign a predetermined device-access key) that is specific to the second electronic device, and may provide or communicate the second device-access key to the second electronic device. As discussed previously, when the second user attempts to access the SVPN using the second electronic device (such as via the second instance of the application that is installed on and that executes on the second electronic device), the second electronic device may use the second device-access key to authenticate with the computer. Note that the second device-access key may include an asymmetric key, such as a secure-shell public encryption key.

Furthermore, when or after the second instance of the application is provided to the second electronic device, the computer may provide a second identification number associated with the second instance of the application. As discussed previously, the second instance of the application may use the second identification number to generate an encoded version of a challenge received from the computer to authenticate the second instance of the application to the computer.

At least some of the aforementioned operations may be repeated for one or more additional users, so that the one or more additional users can join the SVPN of the first user with guest privileges.

In some embodiments, the second user (as well as other users with guest privileges in the SVPN) may not be verified. Therefore, the identity of the second user may not be known to the provider of the SVPN. However, in some embodiments, the second user (as well as other users with guest privileges in the SVPN) may be verified, e.g., by requesting and receiving billing information (and, more generally, providing information to set up an account) from the second user during method 600. Thus, in some embodiments the identity of the second user may be known to the provider of the SVPN.

In this way, the first user of the first electronic device may send invitations or guest messages to one or more users to build up the SVPN. Because there may be multiple invitations pending at a given time, the computer may include a particular transaction identifier in a given guest message. The transaction identifier may be included in a given response so that the first user can determine to which guest message the given response is related.

As noted previously, each of the other users in the SVPN may have their own SVPN. For example, each of the users in the SVPN may be a node in their own separate SVPNs, which at least partially overlap because these SVPNs may share one or more of the users. Thus, if the users establish their own accounts with the provider of the SVPNs, the computer may allow the users to establish their own SVPNs.

Figure 7:
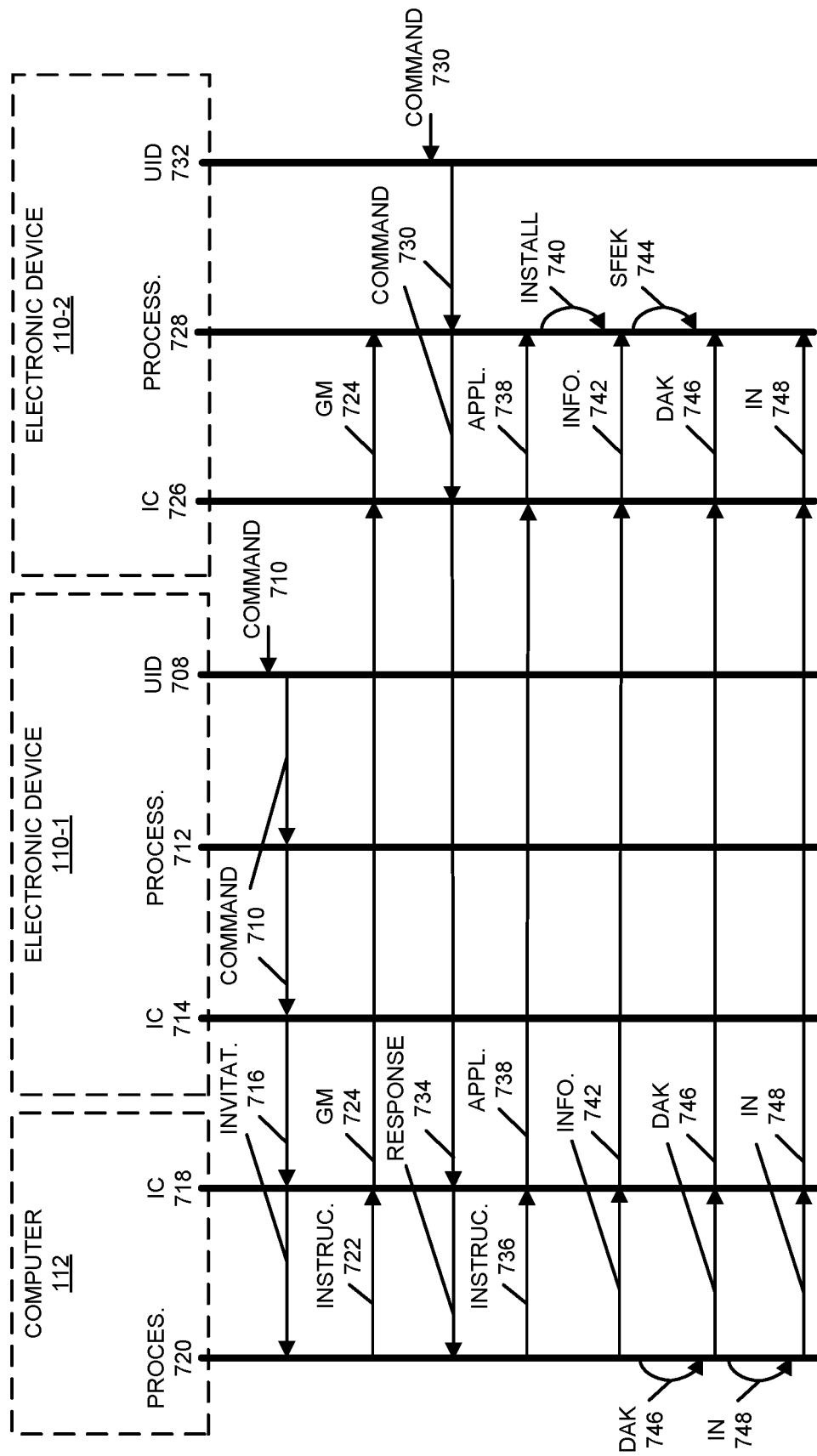
FIG. 7 is a drawing illustrating an example of communication among the electronic devices in FIG. 1 in accordance with an embodiment of the present disclosure.

FIG. 7 presents a drawing illustrating an example of communication among electronic device 110-1, computer 112 and electronic device 110-2. Based at least in part on an instruction or a command 710 received from the first user using a user-interface device 708 in electronic device 110-1 (such as a mouse, a keyboard, a voice-recognition device, a trackpad, another user-interface device, a touch-sensitive display, etc.), a processor 712 in electronic device 110-1 may instruct an interface circuit 714 in electronic device 110-1 to provide an invitation 716 to computer 112, which may include an address associated with a second user.

After receiving invitation 716, interface circuit 718 in computer 112 may provide invitation 716 to processor 720. In response, processor 720 may instruct 722 interface circuit 718 to provide guest message 724 to the address associated with the second user. This guest message may invite the second user to join the SVPN of the first user.

Subsequently, interface circuit 726 in electronic device 110-2 may receive or access guest message 724, which is provided to a processor 728 in electronic device 110-2. Then, based at least in part on an instruction or a command 730 received from the second user using a user-interface device 732 in electronic device 110-2 (such as a mouse, a keyboard, a voice-recognition device, a trackpad, another user-interface device, a touch-sensitive display, etc.), which activates a link included in or specified in guest message 724, processor 728 may instruct interface circuit 726 to provide a response 734 to computer 112.

After receiving response 734, interface circuit 718 may provide it to processor 720. Then, processor 720 may instruct 736 interface circuit 718 to provide a second instance of an application 738 to electronic device 110-2. Moreover, after receiving application 738, processor 728 may install 740 application 738.

Next, processor 720 may provide information 742 to electronic device 110-2 via interface circuit 718. This information can be used to generate a set of second encryption keys (SSEK) 744. (Alternatively, processor 720 may select and provide a predetermined set of encryption keys in a memory in computer 112.) After receiving information 742, interface circuit 726 may provide it to processor 728, which uses information 742 to generate the set of second encryption keys 744. Next, processor 728 may store the set of second encryption keys 744 in a memory (not shown) in electronic device 110-2.

Moreover, processor 720 may generate device-access key 746 and/or identification number 748, which are provided to electronic device 110-2 via interface circuits 718 and 726. Furthermore, processor 728 may store device-access key 746 and/or identification number 748 in the memory in electronic device 110-2.

Figure 8:
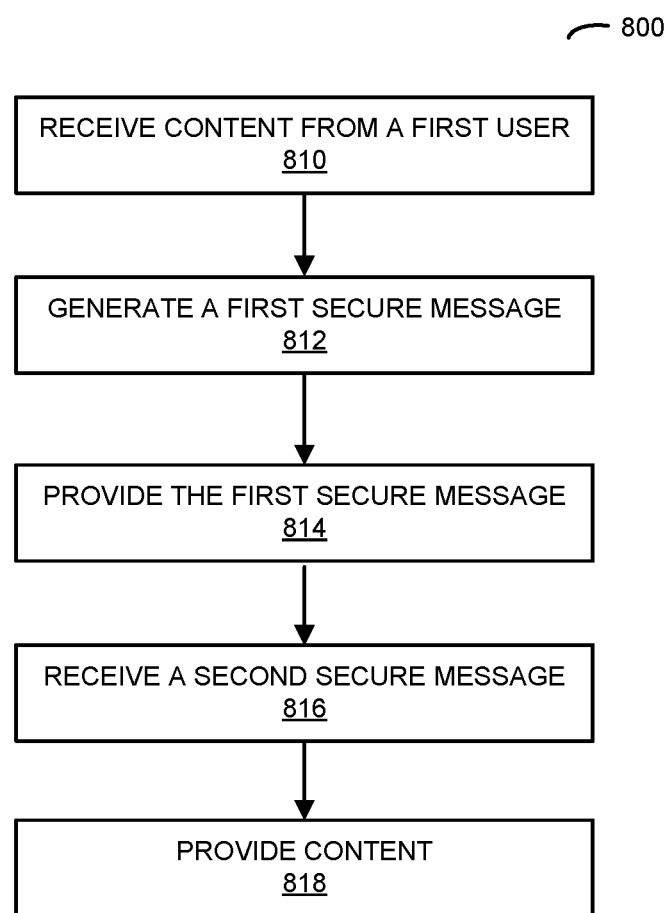
FIG. 8 is a flow diagram illustrating an example method for providing secure communication in an SVPN in accordance with an embodiment of the present disclosure.

FIG. 8 presents a flow diagram illustrating an example method 800 for providing secure communication in an SVPN, which may be performed by a first electronic device (such as electronic device 110-1 in FIG. 1). During operation, the first electronic device receives content from a first user (operation 810). For example, the first user may provide the content to a first instance of an application executing on the first electronic device.

Then, after optionally accessing a first encryption key associated with the first user that is stored in memory, the first electronic device generates a first secure message (operation 812) based at least in part on the content, where generating the message involves encrypting the content based at least in part on the first encryption key. For example, the first instance of an application may generate the first secure message.

Moreover, the first electronic device provides, via an interface circuit in the first electronic device, the first secure message (operation 814) to at least a second electronic device associated with a second user in an SVPN of the first user. For example, the first secure message may include information that specifies a location or a network address of the second electronic device (such as information about a pre-established and maintained association with the second electronic device that is stored in the first electronic device). Alternatively, the first secure message may include information that specifies a location or a network address of a computer that provides the SVPN (such as by information about a pre-established and maintained association with the computer that is stored in the first electronic device), which may forward the first secure message to the second electronic device. Notably, in these embodiments, the first secure message may include information that specifies the second user or the second electronic device, and the computer may use this information to access a location or a network address of the second electronic device.

Furthermore, the first electronic device may receive, via the interface circuit in the first electronic device, a second secure message (operation 816) from at least the second electronic device associated with the second user in the SVPN. This second secure message may be received directly from the second electronic device or may be forwarded to the first electronic device by the computer.

Next, the first electronic device may provide content (operation 818) in the second secure message. For example, the first instance of an application may de-encrypt the second secure message using a second encryption key (which may be the same as or different from the first encryption key), such as an encryption key that is a counterpart to an encryption key associated with the second user that was used to encrypt the second message. In some embodiments, the first and the second electronic devices may use public-private encryption key pairs to allow encryption and de-encryption of secure messages. The encryption key pairs may be specific or reserved for communication between the first electronic device and the second electronic device or may be used during communication between the first electronic device and some or all of the group of electronic devices in the SVPN.

In some embodiments, a secure message communicated between the first electronic device and at least the second electronic device may optionally be digitally signed to authenticate its validity and integrity by allowing tampering to be detected. For example, the first instance of the application may digitally sign the first secure message.

Note that the first secure message or the second secure message may be provided via one or more queues. For example, the first electronic device may continue to attempt to provide the first secure message until it is received by the second electronic device. Then, the first secure message may be removed or deleted from the one or more queues.

Alternatively, queues associated with the users in the SVPN may be maintained by the computer. Notably, there may be a queue associated with each of the users. Secure messages for the users may, therefore, be added to the appropriate queues. When a given queue is not empty, the computer may attempt to communicate the secure messages in the queue to the associated electronic device(s) in the group of electronic devices or to the first electronic device. (More generally, if there are pending outgoing secure messages in multiple queues, the computer may attempt to flush or process the secure messages in these queues.) If, for some reason (such as a power failure), a given secure message is not received by its intended recipient electronic device (e.g., the computer does not receive an acknowledgment message), the given secure message may be maintained in the queue and the computer may continue to try to send the given secure message until it is received (thereby guaranteeing successful communication of the given secure message). After receiving confirmation that the given secure message was received, the computer may delete the given secure message from the queue.

In this way, the first electronic device may communicate with the second electronic device in the SVPN via the computer. While a give secure message may be forwarded by routers and servers in a network (such as network 116 in FIG. 1), the payload may not be extracted from a packet or frame associated with the secure message because only the group of electronic devices and the first electronic device may have access to the encryption key(s) that are needed to de-encrypt the secure message.

Figure 9:
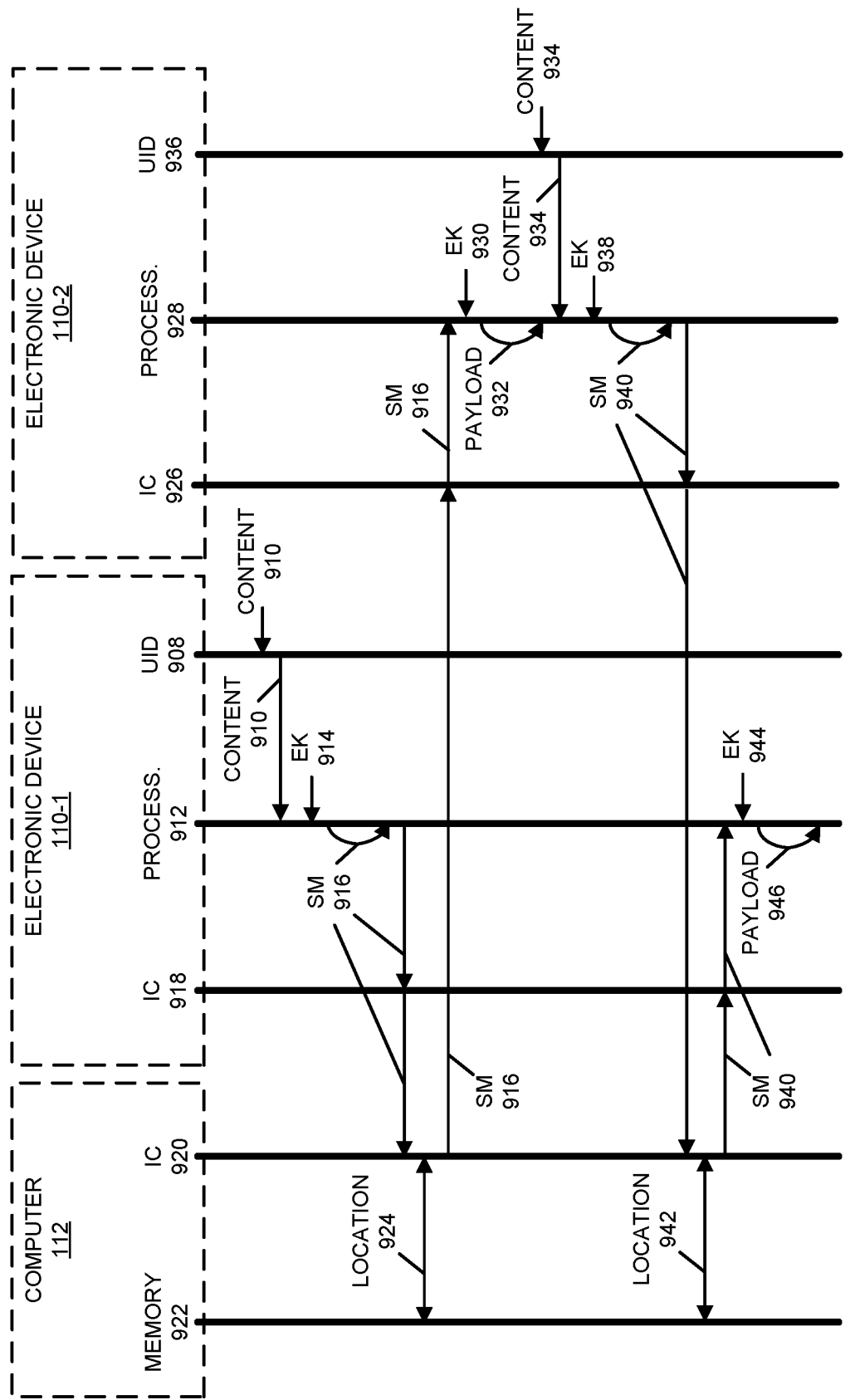
FIG. 9 is a drawing illustrating an example of communication among the electronic devices in FIG. 1 in accordance with an embodiment of the present disclosure.

FIG. 9 presents a drawing illustrating an example of communication among electronic device 110-1, computer 112 and electronic device 110-2. Based at least in part on content 910 received from the first user using a user-interface device 908 in electronic device 110-1 (such as a mouse, a keyboard, a voice-recognition device, a trackpad, another user-interface device, a touch-sensitive display, etc.), a processor 912 in electronic device 110-1 may access encryption key (EK) 914 in a memory (not shown) in electronic device 110-1 to generate a secure message (SM) 916. Then, processor 912 may instruct an interface circuit 918 in electronic device 110-1 to provide secure message 916 to computer 112.

After receiving secure message 916, interface circuit 920 in computer 112 may provide secure message 916 to electronic device 110-2. For example, secure message 916 may include the location of electronic device 110-2 (such as in unencrypted preamble), and computer 112 may forward secure message 916 to electronic device 110-2. Alternatively, secure message 918 may include information that specifies a second user (such as in unencrypted preamble), and computer 112 may access a location 924 of electronic device 110-2 based at least in part on the second user (such as in a look-up table in memory 922 that stores a pre-established and maintained association between computer 112 and electronic device 110-2) and then may forward secure message 916 to electronic device 110-2.

Then, after receiving secure message 916, interface circuit 926 in electronic device 110-2 may provide secure message 916 to processor 928 in electronic device 110-2. Processor 928 may access encryption key 930 in memory (not shown) in electronic device 110-2 to de-encrypt a payload 932 in secure message 916.

Next, based at least in part on content 934 received from the second user using a user-interface device 936 in electronic device 110-2 (such as a mouse, a keyboard, a voice-recognition device, a trackpad, another user-interface device, a touch-sensitive display, etc.), a processor 928 may access encryption key 938 in the memory (not shown) in electronic device 110-2 to generate a secure message 940. Then, processor 928 may instruct interface circuit 926 to provide secure message 940 to computer 112.

After receiving secure message 940, interface circuit 920 may provide secure message 940 to electronic device 110-1. For example, secure message 940 may include the location of electronic device 110-1 (such as in unencrypted preamble), and computer 112 may forward secure message 940 to electronic device 110-1. Alternatively, secure message 940 may include information that specifies the first user (such as in unencrypted preamble), and computer 112 may access a location 942 of electronic device 110-1 based at least in part on the first user (such as in a look-up table in memory 922 that stores a pre-established and maintained association between computer 112 and electronic device 110-1) and then may forward secure message 940 to electronic device 110-1.

Then, after receiving secure message 940, interface circuit 918 may provide secure message 940 to processor 912. Processor 912 may access encryption key 944 in the memory in electronic device 110-1 to de-encrypt a payload 946 in secure message 940.

Figure 10:
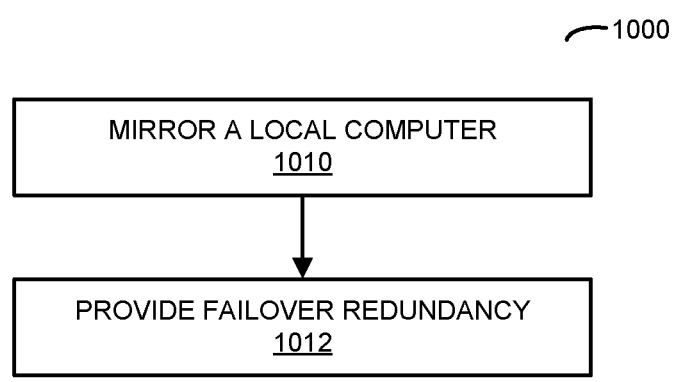
FIG. 10 is a flow diagram illustrating an example method for providing backup and failover for an SVPN in accordance with an embodiment of the present disclosure.

FIG. 10 presents a flow diagram illustrating an example method 1000 for providing backup and failover for an SVPN, which may be performed by a computer (such as computer 112 or the optional local computer 122 in FIG. 1). During operation, the computer may mirror or copy a local computer (operation 1010) that provides a SVPN of a first user. For example, the computer may routinely (such as periodically or after a time interval, such as 5, 10, 15, 30 or 60 min) backup or copy the local computer.

Moreover, the computer may provide failover redundancy (operation 1012) for the local computer. For example, the computer and the local computer may routinely (such as periodically or after a time interval, such as a few minutes)

exchange proof-of-life messages or ping each other. If a timely proof-of-life message is not received from the local computer, the computer may take over and provide the SVPN of the first user until the local computer is available again.

For example, when the local computer is providing the SVPN, secure messages communicated among electronic devices in the SVPN may be routed through the local computer. Then, when the computer is providing the SVPN, secure messages communicated among electronic devices in the SVPN may be routed through the computer. Alternatively, when the local computer is providing the SVPN, secure messages communicated among electronic devices in the SVPN may be routed through the computer and the local computer, e.g., the secure messages may be sent to the computer, which then forwards them to the local computer, which routes them to their destinations. Then, when the computer is providing the SVPN, secure messages communicated among electronic devices in the SVPN may be routed only through the computer.

Note that, when the computer is providing the SVPN, the computer may notify the electronic devices in the SVPN so that secure messages may be directed to the computer. Then, when the local computer is providing the SVPN, the computer or the local computer may notify the electronic devices in the SVPN so that secure messages are directed to the local computer.

In some embodiments, the local computer may provide the same functions as the computer. For example, the local computer may include a virtual machine that provides a container for the SVPN. Furthermore, in some embodiments, the local computer may provide the functions of a router.

Figure 11:
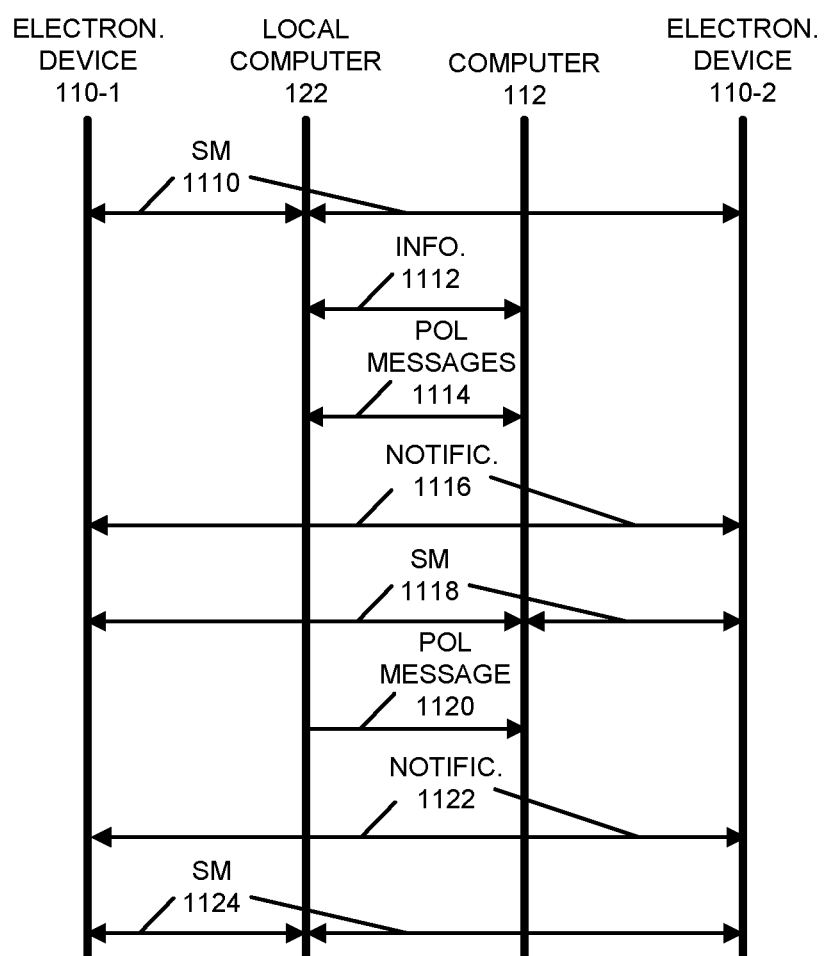
FIG. 11 is a drawing illustrating an example of communication among the electronic devices in FIG. 1 in accordance with an embodiment of the present disclosure.

FIG. 11 presents a drawing illustrating an example of communication among electronic device 110-1, computer 112, the optional local computer 122 and electronic device 110-2. When optional local computer 122 is providing an SVPN, secure messages 1110 may be communicated between electronic devices 110-1 and 110-2 via optional local computer 122. Routinely, computer 112 may backup or copy information 1112 from optional local computer 122.

Moreover, computer 112 and optional local computer 122 may routinely exchange proof-of-life (POF) messages 1114. When a timely POF message is not received by computer 112, computer 112 may take over and provide the SVPN. Furthermore, computer 112 may notify 1116 electronic devices 110-1 and 110-2 that it is providing the SVPN. Consequently, secure messages 1118 may be communicated between electronic devices 110-1 and 110-2 via computer 112.

Subsequently, when computer 112 receives a POF message 1120 from optional local computer 122, computer 112 may notify 1122 electronic devices 110-1 and 110-2 that optional local computer 122 is providing the SVPN. Then, secure messages 1124 may be communicated between electronic devices 110-1 and 110-2 via optional local computer 122.

In some embodiments, optional local computer 122 (which is sometimes referred to as a 'homebase') and/or computer 112 allow users to share their personal information and media in an SVPN in which multiple individuals or organizations (the nodes in the SVPN) interact with each other by exchanging secure messages with information or content via the interconnections or links in the SVPN. This SVPN allows the users to share their lives with their friends, while simultaneously protecting privileged and private information. Thus, optional local computer 122 and/or computer 112 may allow the users full control over who they exchange information with, which allows the users to enjoy the benefits of the online world with more choice over how they share information about themselves with others.

The communication techniques may be implemented using several components, including: optional local computer 122 and/or computer 112. Optional local computer 122 may perform the functions of a home router and, as described further below, the user's account with a provider of optional local computer 122 and the SVPN may be a source or verification of the user's online identity. Moreover, optional local computer 122 and/or computer 112 may function as a jukebox, a filing cabinet at home and online, and thus may be a place where a user stores their most-important information. Consequently, optional local computer 122 and/or computer 112 may provide a common framework for storage and sharing, both inside a local network and remotely.

The SVPN gives users control over what they share. Notably, the SVPN may allow the users to exchange information with each other, such as personal blogs of chat rooms or groups that are organized and discoverable by the users in an SVPN using a decentralized architecture.

Optional local computer 122 and/or computer 112 may combine the functions of a network-attached-storage device and cloud-based storage system. Files stored on optional local computer 122 and/or computer 112 may be shared with a select group of friends (such as the other users in the SVPN). However, sharing and streaming of content may be restricted to connected or associated users in the SVPN, not to the public at large.

One of the problems with many existing peer-to-peer networks is that they are discoverable. Although many consumers have consistent network connections, most do not have permanent IP addresses. This may make it difficult for users to point other users to their electronic devices without centralized guidance or coordination. The distributed SVPN in the communication techniques addresses this problem by tracking, maintaining and, as needed, updating IP addresses and communication ports. For example, when optional local computer 122 is first connected, it may relay its address to computer 112. Whenever, the local IP address changes, optional local computer 122 may update the information stored in computer 112. In addition, optional local computer 122 may update the electronic devices in the SVPN. This may provide a foundation for a layered notification system that disseminates updates to the locations or addresses of optional local computer 122 in the SVPN.

For example, Larry, may have optional local computer 122. Larry may invite Moe and Curly to join his SVPN. After the initial associations are made, optional local computer 122 and computer 112 may be updated with any changes to the addresses of the electronic devices of these users. Moreover, when Larry updates his news feed, optional local computer 122 or computer 112 may send secure messages to Moe and Curly's electronic devices with his latest news. When either of them accesses the SVPN using instances of an application on their electronic devices, their personalized news feed may already be downloaded with the latest updates from their connections. Note that no user content may reside on a web page or a server associated with a provider services (such as a provider of computer 1122). Instead, the data may be pushed out from optional local computer 122 or computer 112 to Moe and Curly's electronic devices.

This approach may offer numerous advantages. For example, because the electronic devices, optional local computer 122 and/or computer 112 may have a copy of the addresses of the electronic devices of the users in the SVPN, it is possible for the users to communicate with each other in the SVPN. This may provide a foundation for other forms of communication, such as: voice over Internet Protocol, video conferencing and/or messaging. Note that at least the payloads in all the communication in the SVPN may be encrypted.

As noted previously, a user's account with a provider of one or more SVPNs may be used to verify the user. This is shown in FIG. 12, which presents a flow diagram illustrating an example method 1200 for providing a verified persona, which may be performed by a computer (such as computer 112 or the optional local computer 122 in FIG. 1). During operation, the computer receives a verification query (operation 1210) from another computer in response to a login attempt by a verified persona to a service associated with or provided by the other computer, where the verification query includes information that specifies the verified persona (such as a fictitious username and/or password). For example, a verified user that has an account with a provider of an SVPN that is hosted by the computer, may establish one or more verified personas using their account. The verified personas may obfuscate the identity of the verified user.

Note that the computer and the other computer may be associated with the same or different entities or providers. For example, the computer may be associated with a first provider, the other computer may be associated with a different second provider, and a provider of an SVPN that is hosted by the computer may be different from the first provider or the second provider.

In response to the verification query, the computer may access stored account information (operation 1212) to determine whether the verified persona is, e.g., valid or not based at least in part on the verified persona. For example, billing information associated with an account of a user may be used to verify one of their one or more verified personas or their identity. Then, the computer may provide a verification response (operation 1214) to the other computer that indicates whether the verified persona is valid or not.

Note that the verification may be performed by a third party (e.g., based at least in part on a credit card or, more generally, based at least in part on a financial instrument of a user). Thus, the verification may be performed out-of-band or using a different channel or communication technique than the communication in the SVPN.

In this way, a user's account with a provider of the SVPN may enable the use of verified personas that provide the benefits of routine anonymity or privacy when using other online applications or services (such as chat applications, social networks, etc.), but that provide the safety or protection associated with users whose identities can be verified or, as needed (such as in an emergency or in response to a request from civil or legal authorities), determined. This may allow the users to selectively control how information about them is shared, while preventing fraudulent, unwanted, criminal or dangerous activity. Furthermore, this capability may allow an online application or service to take appropriate remedial action.

Figure 13:
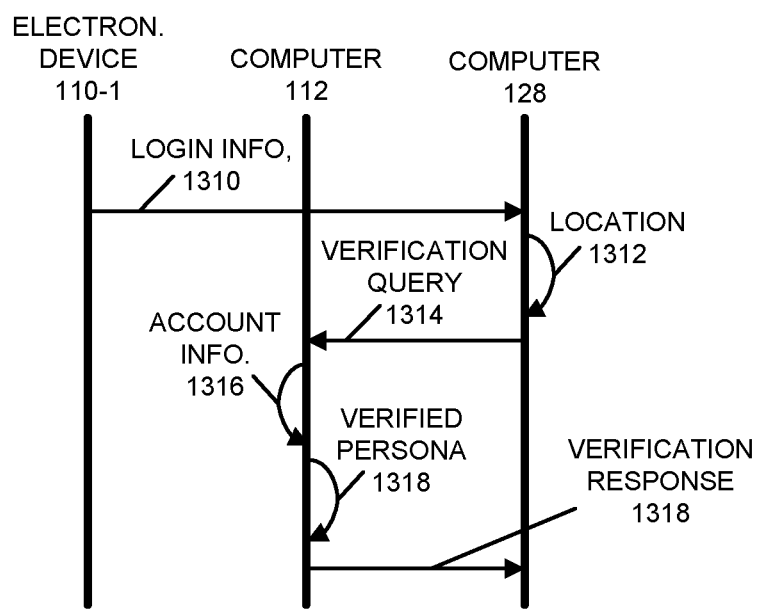
FIG. 13 is a drawing illustrating an example of communication among the electronic devices in FIG. 1 in accordance with an embodiment of the present disclosure.

FIG. 13 presents a drawing illustrating an example of communication among electronic device 110-1, computer 112 and computer 128. Based at least in part on an instruction or command from a user of electronic device 110-1, electronic device 110-1 may provide login information 1310 to computer 128, which provides or hosts an online service or application (such as a social network). This login information may correspond to a verified persona 1318 of the user with an SVPN hosted by computer 112. Consequently, login information 1310 may include a location 1312 or network address of computer 112.

In response to receiving login information 1310, computer 128 may provide a verification query 1314 to computer 112.

Moreover, in response to the verification query 1314, computer 112 may access stored account information 1316 to determine whether verified persona 1318 is, e.g., valid or not based at least in part on verified persona 1318. Then, computer 112 may provide a verification response 1320 to computer 128 that indicates whether verified persona 1318 is valid or not.

Note that, in some embodiments, communication in one or more of the preceding embodiments may involve an out-of-band communication channel and/or a different communication technique that is or are associated with or used in the SVPN. Moreover, communication among components (such as electronic device 110-1 or computer 112 in FIG. 1) in the described embodiments may involve the communication of one or more packets or frames.

Figure 14:
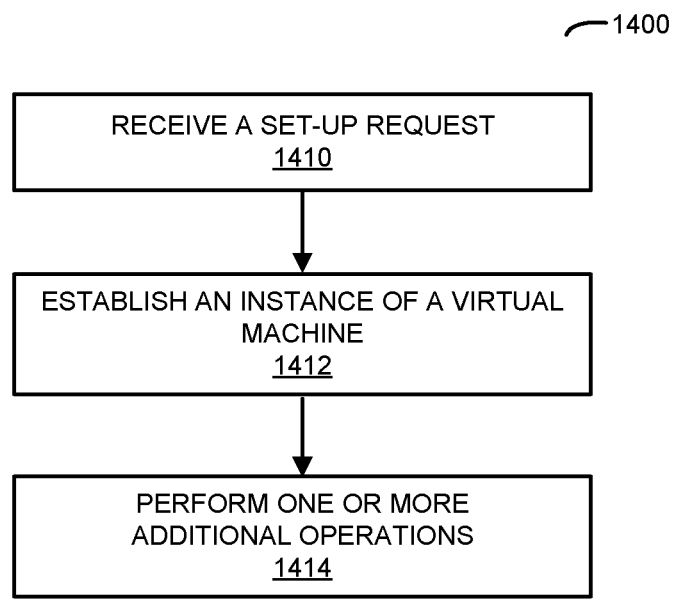
FIG. 14 is a flow diagram illustrating an example method for establishing an SVPN in accordance with an embodiment of the present disclosure.

FIG. 14 presents a flow diagram illustrating an example method 1400 for establishing or providing an SVPN, which may be performed by a computer (such as computer 112 in FIG. 1). During operation, the computer may receive a set-up request (operation 1410), e.g., from a first electronic device associated with a first user or from a program module or instructions executed by the computer. This set-up request may be the same as or different from the request in method 200 (FIG. 2) and/or in method 400 (FIG. 4). For example, in embodiments where the computer sets up the account, the set-up request may be optionally provided by the program module or instructions while or after the account of the first user is set up (assuming that the first user does not already have an account). In some embodiments, the set-up request is received from the optional enrollment computer, which may set up the account and provide the first instance of the application in method 200 (FIG. 2).

Alternatively, after the application is installed on the first electronic device (following the operations in method 200 in FIG. 2), the first user may optionally launch or activate the application. When this occurs for the first time, the application may provide the set-up request to the computer. However, in some embodiments, there may be a single request provide by the first user using the first electronic device. In response to this request, the account for the first user may be set up (via the operations in method 200 in FIG. 2) and the operations in method 1400 may be performed. Thus, the set-up request may optionally occur when the account with the provider of the SVPN is established for the first user and a first instance of an application associated with the SVPN is provided to and/or installed on the first electronic device.

In response to the set-up request, the computer may establish or create an instance of a virtual machine (operation 1412) that provides a container for the SVPN of the first user. This container may include executable package of software that includes everything needed to run the SVPN, including: SVPN code, a runtime executable or compiled SVPN code, tools, libraries and settings. Moreover, memory and processing resources associated with the container may be self-contained and independent of any other virtual machines, process and/or applications on the computer. Therefore, the virtual machine provides a self-contained operating system or environment in which the SVPN executes independently of other virtual machines, process and/or applications on the computer. In some embodiments, the container includes the one or more preconfigured digital wallets associated with the first user, where a given preconfigured digital wallet includes cryptographic keys and a distributed ledger for use in conducting one or more distributed secure transactions (such as a blockchain transaction and, more generally, a transaction associated with a cryptocurrency or an NFT). Thus, the contain may allow the first electronic device to perform or process the one or more distributed secure transactions and/or to conduct the one or more distributed secure transactions in a second computer via the SVPN (and, more generally, via the SVPN and/or another network). In some embodiments, conducting or performing a given distributed secure transaction may involve communication with one or more cryptographic nodes in a cryptographic network or with another computer, which may or may not occur via the SVPN. Alternatively or additionally, the SVPN may allow the first electronic device to communicate securely with a group of electronic devices associated with other users and which may include one or more electronic devices. Note that the electronic devices in the group, as well as the first electronic device, may be remotely located from the computer.

For example, the distributed ledger may include a blockchain that stores one or more NFTs associated with the one or more distributed secure transactions. Moreover, the cryptographic keys may include encryption keys, such as a public encryption key and a private encryption key. Furthermore, the one or more preconfigured digital wallets may enable the first electronic device to perform cryptocurrency mining or to perform the function of an archive node that stores historical information associated with the one or more distributed secure transactions.

In some embodiments, the computer may be included in a distributed computer system, which may include two or more computers that each implement an instance of program instructions for the SVPN (and, thus, which each may include a duplicate instance of the virtual machine container), thereby providing failover redundancy. For example, the computer may provide the SVPN as a cloud-based service that is accessed by the group of electronic devices via a network, such as the Internet. Note that a provider of the computer or the computer system may be different from the provider of the SVPN.

In some embodiments, the computer optionally performs one or more additional operations (operation 1414). For example, the computer may provide, via the interface circuit, a first token intended for the first electronic device. This first token may generate the one or more preconfigured digital wallets on the first electronic device.

Alternatively or additionally, the computer may provide information that can be used to generate a set of first encryption keys to the first electronic device. (Alternatively, the information may be provided when the first application is provided to the first electronic device in method 200 in FIG. 2.) As described previously, these set of first encryption keys (which may include one or more encryption keys) may be used by the first instance of the application to encrypt or de-encrypt secure messages with content or information that are communicated in the SVPN with at least a subset of the group of other electronic devices.

For example, the information may include a second token that is used by the first electronic device (such as the first instance of the application) to generate the set of first encryption keys. Notably, the second token may include or may specify a generating function for the set of first encryption keys. However, in some embodiments, the computer may generate or select the set of first encryption keys, and then may provide the set of first encryption keys to the first electronic device.

Note that the set of first encryption keys may not be stored in the memory and the computer may not be able to access the set of first encryption keys. This may ensure that the users of the SVPN (such as the first user) have exclusive control over who can via the content or the information in the secure messages that are communicated in the SVPN. Stated differently, neither the provider of the SVPN service nor the operator or provider of the computer that hosts the SVPN (which may be different from the provider of the SVPN) may be able to access or de-encrypt the secure messages that are communicated in the SVPN.

In some embodiments, in order to provide redundancy to the set of first encryption keys on the first electronic device, the first user of the electronic device may store the set of first encryption keys in off-line memory (such as a USB memory stick). Alternatively or additionally, as discussed previously, in some embodiments the first user may have more than one electronic device that has master privileges and that stores or has access to the set of first encryption keys.

As part of establishing the virtual machine with the container (operation 1412), the computer may establish a maintained association with the first electronic device in the SVPN. For example, maintaining a pre-established association may include storing in memory on the computer the location or network address of the first electronic device (such as an IP address, or equivalently a fully qualified domain name, and a communication port). In turn, another component in the SVPN (such as the first electronic device) may maintain a pre-establish a counterpart association with the computer. In the discussion that follows, a 'maintained association' includes locations that allow a given electronic device or the computer to establish a dynamic 'connection' (such as a connection using a TCP/IP protocol), which allows the given electronic device or the computer to securely communicate content or information in the SVPN.

Thus, the container in the computer may include the information (such as the locations or network addresses) needed to route communication between the first electronic device and the group of electronic devices based at least in part on established and long-lived associations in the SVPN (and without assistance of another computer in the network) that convey the communication among the first electronic device, the computer and the group of electronic devices via at least a non-wireless communication technique, such as Ethernet. Note that the computer may support up to N SVPNs of N users, where N is a non-zero, positive integer and the N SVPNs have separate containers and are independent of each other. While electronic devices in the group of electronic devices may be included in more than one SVPN, the communication within an SVPN may be independent of the communication in another SVPN. Moreover, electronic devices in the group of electronic devices that are associated with different users may include additional instances of containers, where a given additional instance of the contains may include one or more preconfigured digital wallets associated with a given one of the different users.

In some embodiments, components in the SVPN (such as the first electronic device or the computer) may also maintain the associations by updating each other regarding any changes to the locations of any of the electronic devices or the computer (such as a change to an IP address, or equivalently a change to a fully qualified domain name, and/or a change to a communication port). As an analogy, the components in the SVPN may each function as their own personal Domain Name System, so that the SVPN is distributed and is not dependent on location information that is centrally stored in a network (such as network 116 in FIG. 1) and, thus, is less vulnerable to tampering, denial of service attacks, etc.

Note that the first instance of the application may provide master privileges in the SVPN to the first user. Furthermore, in some embodiments, the first user can add one or more additional electronic devices to the SVPN, and which as associated with the account of the first user. As with the first electronic device, the one or more additional electronic devices may have master privileges in the SVPN. The one or more additional electronic devices may have access to the set of first encryption keys. For example, when the first user adds the one or more additional electronic devices to the SVPN, the first electronic device may provide the set of first encryption keys or information that specifies the set of first encryption keys (such as the second token or another token) to the one or more additional electronic devices. Alternatively, in response to a add request received from the first electronic device, the computer may generate or select and provide the other token to the first electronic device. Then, the first electronic device may forward the other token and the location of the computer (such as an IP address, or equivalently a fully qualified domain name, and a communication port) to one of the one or more additional electronic devices. Moreover, after receiving the other token, this other electronic device may submit the other token to the computer. If the computer determines that the other token is valid, the computer may generate another device-access key (or may assign another predetermined device-access key) that is specific to the other electronic device, and may provide or communicate the other device-access key to the other electronic device. This other device-access key may authenticate the other electronic device to the computer when the use attempts to access the SVPN using the other electronic device.

Figure 15:
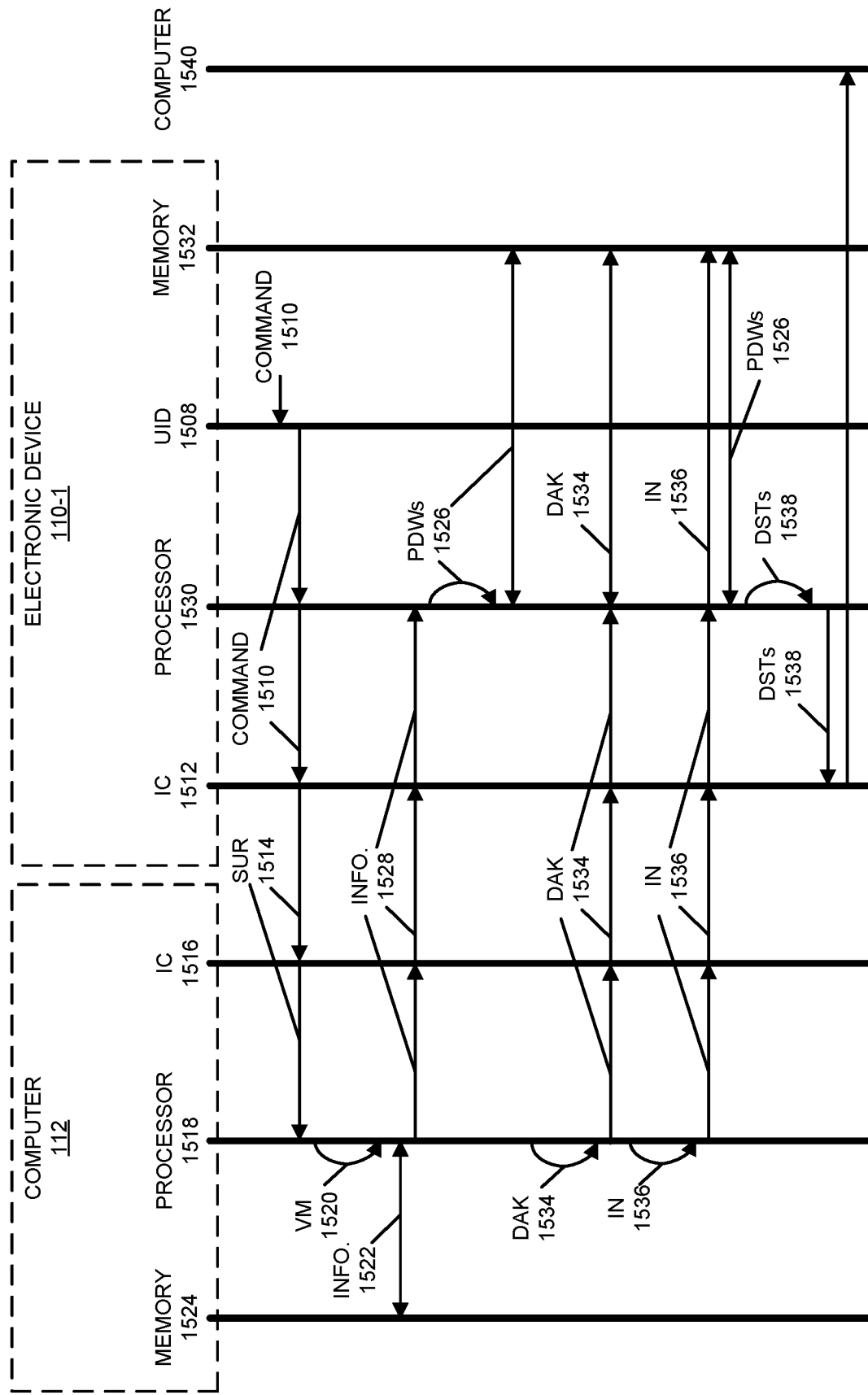
FIG. 15 is a drawing illustrating an example of communication among the electronic devices in FIG. 1 in accordance with an embodiment of the present disclosure.

FIG. 15 presents a drawing illustrating an example of communication between electronic device 110-1 and computer 112. Based at least in part on an instruction or a command 1510 received from the first user using a user-interface device 1508 in electronic device 110-1 (such as a mouse, a keyboard, a voice-recognition device, a trackpad, another user-interface device, a touch-sensitive display, etc.), processor 1530 in electronic device 110-1 may instruct an interface circuit 1512 in electronic device 110-1 to provide a set-up request 1514 to computer 112.

After receiving request 1514, interface circuit 1516 in computer 112 may provide set-up request 1514 to processor 1518. In response, processor 1518 may establish a virtual machine 1520 that provides a container for an SVPN for the first user, including storing associated information 1522 in memory 1524 in computer 112. This information may include one or more preconfigured digital wallets (PDWs) 1526 associated with the first user, where a given preconfigured digital wallet may include cryptographic keys and a distributed ledger for use in conducting one or more distributed secure transactions.

Then, processor 1518 may provide information 1528 to electronic device 110-1 via interface circuit 1516. This information can be used to generate the content of the one or more preconfigured digital wallets 1526. (Alternatively, processor 1518 may select and provide one or more predetermined preconfigured digital wallets in memory 1524.) After receiving information 1528, interface circuit 1510 may provide information 1528 to processor 1530, which uses information 1528 to generate the one or more preconfigured digital wallets 1526. Next, processor 1530 may store the content of the one or more preconfigured digital wallets 1526 in memory 1532 in electronic device 110-1.

Moreover, processor 1518 may generate device-access key (DAK) 1534, which is provided to electronic device 110-1 via interface circuits 1516 and 1512. Furthermore, processor 1530 may store device-access key 1534 in memory 1532. In some embodiments, processor 1530 provides an identification number (IN) 1536 of the first instance of the application 336 to electronic device 110-1 via interface circuits 1516 and 1512. This identification number may be stored by processor 1530 in memory 1532.

Furthermore, processor 1530 may use the content of the one or more preconfigured digital wallets 1526 to perform or process the one or more distributed secure transactions (DSTs) 1538 and/or to conduct the one or more distributed secure transactions 1538 in a computer 1540 via interface circuit 1512 and the SVPN.

Figure 16:
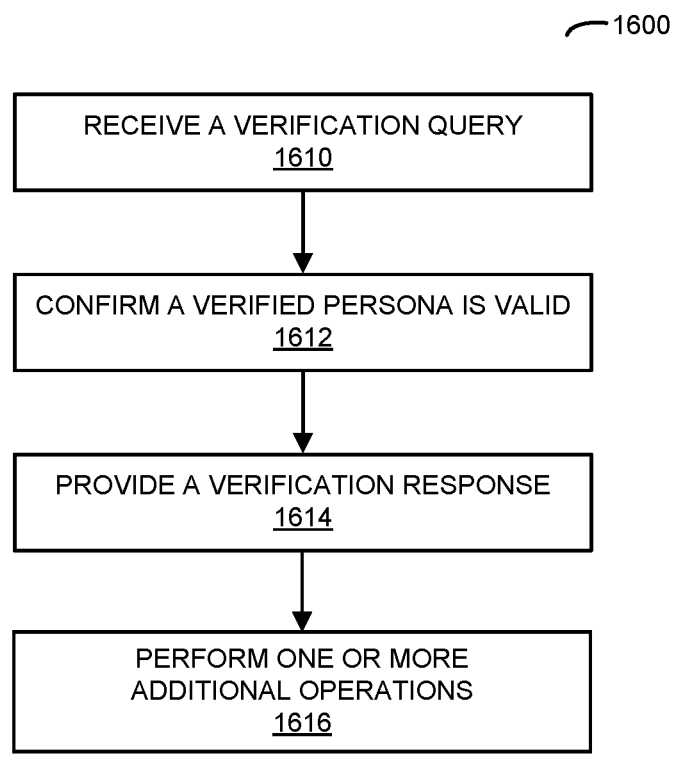
FIG. 16 is a flow diagram illustrating an example method for providing a verified persona in accordance with an embodiment of the present disclosure.

As noted previously, a user's account with a provider of one or more SVPNs may be used to verify the user, e.g., for a distributed token (such as an NFT) associated with the user and/or during one or more distributed secure transactions associated with or that uses the distributed token. This is shown in FIG. 16, which presents a flow diagram illustrating an example method 1600 for providing a verified persona, which may be performed by a computer (such as computer 112 or the optional local computer 122 in FIG. 1). During operation, the computer receives a verification query (operation 1610) from a second computer, where the verification query includes information specifying the verified persona (such as a fictitious or fake name of the individual or an alphanumeric identifier of the individual), and the verified persona is associated with a distributed token. Note that an identity of an individual associated with the verified persona is anonymous to the second computer and is known to the computer based at least in part on a SVPN that includes the individual. For example, the individual may be a verified user that has an account with a provider of an SVPN (which may be hosted by the computer), and the individual may have established one or more verified personas using their account. The one or more verified personas may obfuscate the identity of the verified user. In some embodiments, the verification query is based at least in part on a distributed secure transaction associated with the distributed token.

In response to the verification query, the computer may confirm that the verified persona is valid (operation 1612) based at least in part on the verification query. Notably, the computer may access stored account information (operation to determine whether the verified persona is, e.g., valid or not based at least in part on the verified persona. For example, billing information associated with an existing account of the individual may be used to verify one of their one or more verified personas or their identity. Then, the computer may provide a verification response (operation 1614) to the second computer that indicates whether the verified persona is valid or not, while keeping the identity of the individual associated with the verified persona anonymous to at least the second computer.

In some embodiments, the computer optionally performs one or more additional operations (operation 1616). Notably, the verification may be performed by a third party (e.g., based at least in part on a credit card or, more generally, based at least in part on a financial instrument of a user). Thus, the verification (including the receiving in operation 1610 and the providing in operation 1614) may be performed out-of-band or using a different channel or communication technique than the communication in the SVPN.

For example, the verified persona may obfuscate the identity of the individual from the provider and confirming the verified persona (operation 1612) may include: providing a second verification query to a third computer associated with a second provider, where the second verification query requests verification of the verified persona, the second provider is different from the provider, and the second provider includes: a credit-card company, a type of bank, or another provider of a financial instrument associated with the individual; receiving a second verification response from the third computer, where the second verification response indicates whether the verified persona is valid, while keeping the identity of the individual associated with the verified persona anonymous to the provider, and where the verification response is based at least in part on the second verification response.

Alternatively or additionally, the computer may: receive a request from the second computer, where the request indicates there is an emergency associated with the verified persona, unwanted, potentially dangerous or possible criminal activity associated with the verified persona, or that the identity of the individual is needed for another reason (such as in order to complete a distributed secure transaction); determine the identity of the individual based at least in part on the request; and provide a response to the second computer, where the response specifies the identity of the individual, so that the individual is no longer anonymous to the second computer. In some embodiments, the computer may include: providing an authorization request to an electronic device associated with the individual, where the authorization request requests approval from the individual to provide the identity of the individual to the second computer; and receiving authorization from the electronic device, where the authorization approves the request and the providing of the response is based at least in part on the authorization. Note that based at least in part on the authorization, the computer may be able to determine the identity of the individual, e.g., by accessing a look-up table and/or decrypting secure stored information that specifies the identity of the individual.

In this way, an individual's account with a provider of the SVPN may enable the use of one or more verified personas with the distributed token that provide the benefits of routine anonymity or privacy (such as when exchanging content associated with the distributed token and/or when conducting or performing a distributed secure transaction), but that provide the safety or protection associated with individuals whose identities can be verified or, as needed (such as in an emergency or in response to a request from civil or legal authorities), determined. This may allow the individual to selectively control how information about them is shared, while preventing fraudulent, unwanted, criminal or dangerous activity. Furthermore, this capability may allow the distributed secure transaction to be performed while prevent fraud or criminal activity.

In some embodiments of method 200 (FIG. 2), 400 (FIG. 4), 600 (FIG. 6), 800 (FIG. 8), 1000 (FIG. 10), 1200 (FIG. 12), 1400 (FIG. 14) and/or 1600, there may be additional or fewer operations. Moreover, one or more different operations may be included. Furthermore, the order of the operations may be changed, and/or two or more operations may be combined into a single operation. Additionally, one or more of the operations performed in a given method may be performed in a different method or in two or more different methods.

Figure 17:
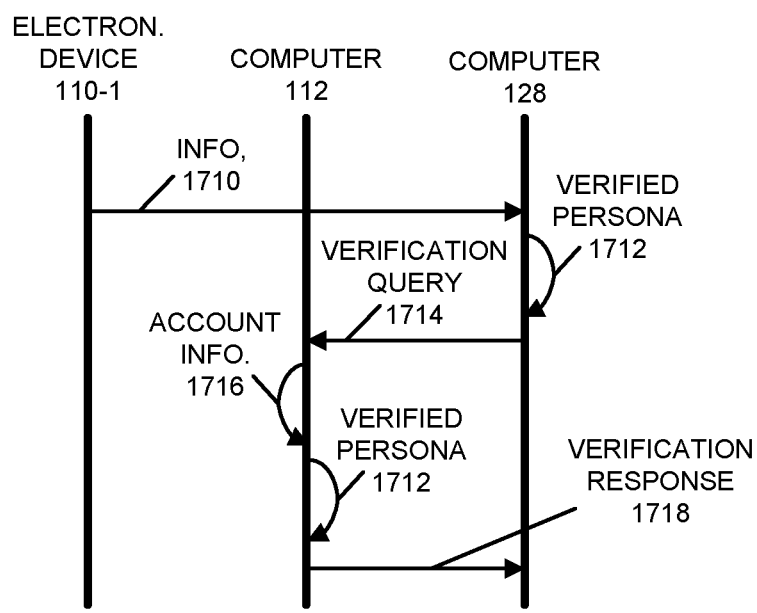
FIG. 17 is a drawing illustrating an example of communication among the electronic devices in FIG. 1 in accordance with an embodiment of the present disclosure.

FIG. 17 presents a drawing illustrating an example of communication among electronic device 110-1 and computer 112 and computer 128. Based at least in part on an instruction or command from a user of electronic device 110-1, electronic device 110-1 may provide information 1710 to computer 128. This information may specify a verified persona 1712 of the user, and verified persona 1712 may be associated with a distributed token. Moreover, the user may be included in an SVPN (which may be hosted by computer 112). Note that electronic device 110-1 may provide information 1710 during a distributed secure transaction between electronic device 110-1 and computer 128.

In response to receiving information 1710, computer 128 may provide a verification query 1714 to computer 112, where verification query 1714 may include information 1710.

Moreover, in response to receiving verification query 1714, computer 128 may determine whether verified persona 1712 is, e.g., valid or not based at least in part on verified persona 1712. For example, computer 128 may access stored account information 1716 to confirm that verified persona 1712 is a user included in the SVPN and/or that is associated with the distributed token. Then, computer 112 may provide a verification response 1718 to computer 128 that indicates whether verified persona 1712 is valid or not.

Note that an identity of user associated with verified persona 1712 is anonymous to computer 128. Thus, verified persona 1712 may obfuscate the identity of the verified user to computer 128.

In some embodiments, communication in one or more of the preceding embodiments may involve an out-of-band communication channel and/or a different communication technique that is or are associated with or used in the SVPN. Moreover, communication among components (such as electronic device 110-1 or computer 112 in FIG. 1) in the described embodiments may involve the communication of one or more packets or frames.

While operations in the preceding embodiments are illustrated as involving one of unilateral or bilateral communication, in general a given operation in the preceding embodiments may involve unilateral or bilateral communication.

We now further describe the communication techniques. In some embodiments, a given preconfigured digital wallet may facilitate the use of a blockchain-based distributed ledger and NFT integration. Regarding the pre-configuration of a given digital wallet, in order to generate the cryptographic keys (such as a bitcoin key), a secure source of entropy or randomness is needed. Creating a bitcoin key may, e.g., be performed by picking a number between 1 and 2256. The specific technique used to pick this number may not matter as long as it is not predictable or repeatable.

Typically, bitcoin software may use a random number generator in an operating system to produce 256 bits of entropy (or randomness). In particular, a private key may be a number between 1 and n−1, where n is a constant (e.g., n may equal 1.158.1077, which is slightly less than 2256) defined as the order of an elliptic curve used in bitcoin. In order to create such a key, a 256-bit number may be selected at random and a check may be performed to confirm that this number is less than n−1. In programming terms, this is usually achieved by feeding a larger string of random bits, which is obtained from a cryptographically secure source of randomness, into a SHA256 hash technique that produces a 256-bit number. If the result is less than n−1, then the 256-bit number may be a suitable private key. Otherwise, these operations may be repeated with another random number.

The public key may be calculated from the private key using elliptic curve multiplication, which is irreversible:

K=k·G where k is the private key, G is a constant point called the generator point, and K is the resulting public key. The reverse operation (which is sometimes referred to as 'finding the discrete logarithm' or calculating k if you know K) is as difficult as trying all possible values of k or performing a brute-force search.

In some embodiments, in order to create a digital wallet or a series of digital wallets with enough entropy to be truly random, the computer: may call a word dictionary, may ensure that no words are repeated, may determine the hash value of the series of words using a SHA256 hash function, and then may use this hash value to create a wallet address of a digital wallet. These operations may be performed as part of the deployment/sign-up process with the digital wallet available for immediate use right after onboarding.

Moreover, in some embodiments, the one or more preconfigured digital wallets may enable a given electronic device associated with a given user to support local processing of a transaction (which is sometimes referred to as a 'distributed secure transaction'), remote processing of a transaction, and/or mining operations (e.g., mining operations for a cryptocurrency). In terms of the resources needed to support one or more these operations (and, thus, the use of the given electronic device as a cryptographic node, e.g., a blockchain node), note that blockchain nodes usually store a complete copy of the distributed ledger and are often responsible for the reliability of the stored data. Cryptographic nodes may be used by developers for building blockchain-based applications.

In some embodiment, a provider of the computer (and, thus, the communication techniques) may operate as such a cryptographic-node service provider inside the virtual space of or associated with a participating user, organization or business. Thus, the communication techniques may eliminate the need for a user to engage the services of a separate cryptographic-node service provider to establish or create a cryptographic node, and/or to provide services associated with a cryptographic node.

Note that blockchain nodes in a cryptographic network may be responsible for the correctness (or accuracy) and reliability of stored entered data in the distributed ledger. For example, each blockchain node may store a complete copy of the distributed ledger. Based at least in part on the blockchain nodes, a given user may be able to access the data and can view all transactions conducted or stored on the cryptographic network. In the disclosed communication techniques, the SVPN may allow the data to be access and/or viewed in a controlled manner, such as by the members in the SVPN who have appropriate privileges (such as master privileges and/or guest privileges).

In general, launching a blockchain node may be the only way to connect to a blockchain. Notably, each new blockchain node may contribute to the decentralization of the cryptographic network, thereby reducing the transaction time and associated fees. By setting up a blockchain node, a user may receive income associated with the transactions that go through the blockchain node.

Additionally, note that blockchain nodes may operate using consensus. Notably, they may share information about transactions and the amount of funds, confirm transactions and store copies of the confirmations, and/or participate in the building of new blocks in the chain in a cryptographic network (which may be in exchange for a financial reward or compensation). In some embodiments, a business using blockchain nodes may be based at least in part on commissions that are received for transfers and/or the purchase or sale of cryptocurrency assets on an exchange.

Deployment of a full blockchain node typically involves hardware, software and/or cryptographic network connection satisfying certain requirements. Consequently, in order to deploy a full blockchain node, a number of requirements may need to be taken into account. While previously it was sometimes possible to launch a blockchain node using weak hardware or equipment, as blockchains have grown into popular cryptographic networks, memory and processor power are often a decisive factor in the successful deployment of a blockchain node.

Before starting to deploy a blockchain node, the minimum hardware requirements usually needed to be specified depending on the current type(s) of cryptocurrencies (such as bitcoin) that supported. For example, the minimum requirements for installing a bitcoin node blockchain may be: the electronic device is running the latest version of a Windows, Mac OS X, or Linux operating system; 500 GB or more of free disk space available with a minimum read speed of 100 MB/s; a solid-state drive (SSD) capable of performing 68 MB/s random writes and 30.9 MB/s random reads; at least 112 GB dynamic random access memory (DRAM) capacity; at least 8 GB of random access memory (RAM); and/or an unlimited broadband network or Internet connection with a download speed of at least 400 kb (50 kB)/s and a high upload data rate. Moreover, running an Ethereum (or cryptocurrency) cryptographic node typically requires system administrator skills. Consequently, in some embodiments of the communication techniques, the computer may determine and/or verify the hardware and/or software capabilities of a given electronic device. For example, the set-up request may include information specifying hardware and/or software capabilities of a given electronic device, and the computer may compare this information to predefined hardware and/or software capabilities associated with different cryptographic-node operations. Alternatively, the set-up request may include an address of the given electronic device and the computer may request the information specifying hardware and/or software capabilities from the given electronic device. Then, after receiving the information, the computer may compare the information to predefined hardware and/or software capabilities associated with different cryptographic-node operations. Based at least in part on the comparison, the computer may selectively provide the one or more preconfigured digital wallets (when the given electronic device has the minimum capabilities) and/or may adapt the one or more preconfigured digital wallets (such as a type of synchronization or whether cryptocurrency mining is performed).

Using Ethereum as an illustrative example, synchronization of an Ethereum cryptographic node is possible in three synchronization modes: fast, full, and light. The fast synchronization mode is the default. In this synchronization mode, there is no download of transaction history, digital wallet balances, or smart contract codes.

The most expensive synchronization mode is full synchronization mode because it typically requires powerful hardware: 16 GB of RAM and a capacious SSD disk. Moreover, synchronization of an Ethereum archive node with tracing can take several weeks, even using an SSD disk. When an error occurs in the client/software version for a cryptographic node, it is usually necessary to re-synchronize the cryptographic node from scratch. This can be an expensive process. In general, a user may also need to ensure the security of their cryptographic node, which often requires cybersecurity skills. In some embodiments, the communication techniques may reduce or eliminate the skill requirements by providing the container with the one or more preconfigured digital wallets. Note that, in some embodiments, if synchronization is started from the disk drive, a cryptographic node may not synchronize because of the difference between the speed of blockchain creation (which, in general, is higher) and the speed of writing to disk. Both the speed of the network connection and the hardware capabilities of the cryptographic node may be important in this regard.

Moreover, the Ethereum light node synchronization mode often has the most complaints. While errors occur frequently, this synchronization mode is one of the most balanced: fast synchronization, less resource usage, provides wallet balances, and smart contracts are pulled up.

Note that currently the bitcoin network is supported by over 11,000 bitcoin nodes. Most of these bitcoin nodes are deployed in North America and Western Europe. Furthermore, there are 6,447 active Ethereum cryptographic nodes. Additionally, a user may connect a cryptographic node to the main cryptographic network or may run it on a test cryptographic network for testing and/or development. By default, a standard Ethereum cryptographic node runs in the console. It may run as a background process by writing service in the system or starting a cryptographic node on the screen. In general, a user may need to carefully monitor the mode in which the cryptographic node is started. If the cryptographic node is run in test mode, then the user may not be able to track transactions.

In order to install a bitcoin node, a user typically needs to create a folder to store blockchain data somewhere in a file system. In the communication techniques, this may be addressed by the one or more preconfigured digital wallets. Moreover, in order to synchronize the full bitcoin blockchain, 380 GB is currently required. In the communication techniques, spaces may share a single copy of the blockchains supported within a cluster or group of electronic devices that implement cryptographic nodes, thereby allowing each electronic device to operate as a cryptographic node without requiring multiple copies of the same data. Note that one of the cryptographic nodes may be designated as an updater of the data for a remainder of the cryptographic nodes in the group of electronic devices.

This process may be time-consuming. Moreover, hardware problems may also be detected, and an interrupted download may resume from the moment it was interrupted. After a successful copy, a client (such as an electronic device) may start the blockchain synchronization process. Furthermore, in order to start a cryptographic node, a user may need to allow an incoming connection through a port (such as port 8333) in their firewall.

The next operation may be to check if the cryptographic node is working. In order to o perform this check, the user may send a request to the cryptographic node with information about the service or may request data from the blockchain. Additionally, the user may also want to monitor the cryptographic node, such as by using a service availability check on a TCP port. If the cryptographic node crashes, the user may have to restart it manually.

In general, when a user attempts to deploy a cryptographic node by themselves, they may encounter problems, such as limited bandwidth (e.g., some network providers may charge extra for using excess bandwidth not included in their plan). Moreover, the network connection may be unstable. If the synchronization of the cryptographic node with the cryptographic network is interrupted, then a restart is required. If cryptographic-node deployment occurs on a business network, it can slow down or result in a bottleneck in normal network traffic. Furthermore, while computer viruses have been placed on the bitcoin blockchain, it is typically not possible to infect a bitcoin node with such viruses. However, some antivirus programs may move associated data to quarantine, which may make it difficult for the bitcoin node to work. In general, in the communication techniques a user may be responsible for ensuring that a cryptographic node is not hacked by a third party.

Thus, a user that launches a full cryptographic node on their own often involves: financial expense for purchasing equipment that complies with the cryptographic-node requirements; ensuring an uninterrupted network connection, and/or the ability to control the cryptographic node via a command line. In the communication techniques, the use of the one or more preconfigured digital wallets may allow a computer that implements the communication techniques to address these problems.

In some embodiments, a distributed ledger in a given preconfigured digital wallet may store a distributed token, such as an NFT or another type of token. As with physical money, in general cryptocurrencies are fungible. This means that they can be traded or exchanged, one for another. For example, one bitcoin is always equal in value to another bitcoin. Similarly, a single unit of an Ether cryptocurrency is always equal to another unit. This fungibility characteristic makes cryptocurrencies suitable as a secure medium of transaction in a digital economy.

NFTs shift the cryptocurrency paradigm by making each token unique and irreplaceable, thereby making it impossible for one NFT to be equivalent to another. Instead, they may be digital representations of assets and have been likened to digital passports because each token contains a unique, non-transferable identity to distinguish it from other tokens. They are also extensible, which means that two NFTs may be combined to 'breed' or create a third, unique NFT.

As with bitcoin, NFTs may also include or contain ownership details to facilitate owner identification and transfer between token holders. Owners may also add metadata or attributes pertaining to the asset in NFTs. For example, tokens representing coffee beans may be classified as fair trade. Alternatively, an artist may sign their digital artwork with their own signature in the metadata.

NFTs are an evolution of the concept of cryptocurrencies. Modern finance systems consist of sophisticated trading and loan systems for different asset types, ranging from real estate to lending contracts to artwork. By enabling digital representations of physical assets, NFTs may enable the reinvention of this infrastructure. While the idea of digital representations of physical assets or the use of unique identification is not, per se, new, when these concepts are combined with the benefits of a tamper-resistant blockchain of smart contracts, they can be a potent force for change.

NFTs evolved from the ERC-721 standard. This standard defines the minimum interface (ownership details, security, and metadata) required for the exchange and distribution of gaming tokens. The ERC-1155 standard takes the concept further by reducing the transaction and storage costs required for NFTs and batching multiple types of NFTs into a single contract.

In general, NFTs may provide market efficiency. Notably, the conversion of a physical asset into a digital one may streamline processes and remove intermediaries. For example, NFTs representing digital or physical artwork on a blockchain may remove the need for agents and may allow artists to connect directly with their audiences. NFTs may also improve business processes. Thus, an NFT for a wine bottle may make it easier for different entities or organizations in a supply chain to interact with the wine bottle and help track its provenance, production, and sale through the entire process.

In some embodiments, NFTs may be used for identity management. Notably, consider physical passports that need to be produced at every entry and exit point from a country or jurisdiction. By converting individual passports into NFTs, each with its own unique identifying characteristics, it is possible to streamline the entry and exit processes for jurisdictions.

Expanding on this use case, NFTs may be used for identity management within the digital realm as well. In some embodiments of the communication techniques, this may allow a verified persona to be tied to an NFT, thereby confirming and specifying ownership of the NFT while protecting the identity of an individual.

Note that NFTs may also be used to democratize investing by fractionalizing physical an asset, such as real estate. In general, it may be easier to divide a digital real-estate asset among multiple owners than a physical one. This tokenization approach is not constrained to one type of asset (such as real estate). Instead, it can be used with a wide variety of assets, such as artwork. Consequently, a painting need not always have a single owner. Its digital equivalent may have multiple owners, each responsible for a fraction of the painting. Such arrangements may increase the value of the artwork.

Figure 18:
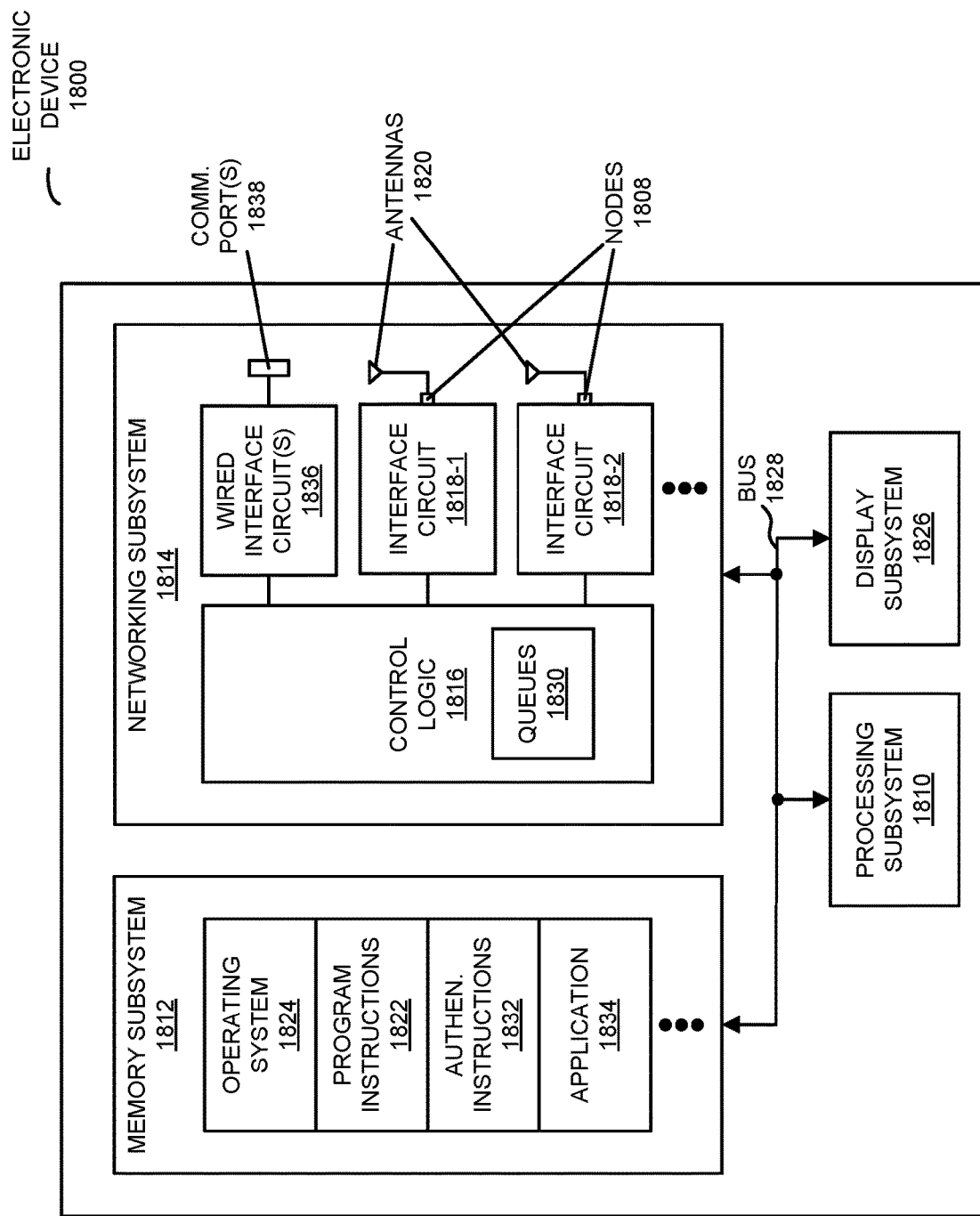
FIG. 18 is a block diagram illustrating one of the electronic devices of FIG. 1 in accordance with an embodiment of the present disclosure.

FIG. 18 presents a block diagram illustrating an electronic device 1800, such as one of electronic devices 110, computer 112, optional enrollment computer 114, optional base station 118, optional access point 120, or optional local computer 122 in FIG. 1. This electronic device includes processing subsystem 1810, memory subsystem 1812 and networking subsystem 1814. Processing subsystem 1810 includes one or more devices configured to perform computational operations. For example, processing subsystem 1810 can include one or more microprocessors, application-specific integrated circuits (ASICs), microcontrollers, programmable-logic devices, graphical processing units (GPUs) and/or digital signal processors (DSPs). One or more of these components in processing subsystem are sometimes referred to as a 'control mechanism' or a 'control circuit.'

Memory subsystem 1812 includes one or more devices for storing data and/or instructions for processing subsystem 1810 and/or networking subsystem 1814. For example, memory subsystem 1812 can include dynamic random access memory (DRAM), static random access memory (SRAM), and/or other types of memory. In some embodiments, instructions for processing subsystem 1810 in memory subsystem 1812 include: one or more program modules or sets of instructions (such as program instructions 1822, operating system 1824, authentication instructions 1832 or application 1834), which may be executed by processing subsystem 1810. Note that the one or more computer programs may constitute a computer-program mechanism. Moreover, instructions in the various modules in memory subsystem 1812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1810.

In addition, memory subsystem 1812 can include mechanisms for controlling access to the memory. In some embodiments, memory subsystem 1812 includes a memory hierarchy that comprises one or more caches coupled to a memory in electronic device 1800. In some of these embodiments, one or more of the caches is located in processing subsystem 1810.

In some embodiments, memory subsystem 1812 is coupled to one or more high-capacity mass-storage devices (not shown). For example, memory subsystem 1812 can be coupled to a magnetic or optical drive, a solid-state drive, or another type of mass-storage device. In these embodiments, memory subsystem 1812 can be used by electronic device 1800 as fast-access storage for often-used data, while the mass-storage device is used to store less frequently used data.

Networking subsystem 1814 includes one or more devices configured to couple to and communicate on a wired and/or wireless network (i.e., to perform network operations), including: control logic 1816, interface circuits 1818 and associated antennas 1820. (While FIG. 18 includes antennas 1820, in some embodiments electronic device 1800 includes one or more nodes, such as nodes 1808, e.g., pads, which can be coupled to antennas 1820. Thus, electronic device 1800 may or may not include antennas 1820.) For example, networking subsystem 1814 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 1818 and at least one of antennas 1820 may constitute a radio. In some embodiments, networking subsystem 1814 includes a wired interface, such as an Ethernet interface.

Networking subsystem 1814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1800 may use the mechanisms in networking subsystem 1814 for performing simple wireless communication between the electronic devices, e.g., transmitting advertising or beacon frames and/or scanning for advertising frames transmitted by other electronic devices as described previously. In some embodiments, networking subsystem 1814 includes queues 1830 that are associated with users of other instances of electronic device 1800.

Authentication instructions 1832 may implement a coding technique (such as a current coding technique specified by a setting or flag in operating system 1824), which is used to verify electronic device 1800 and/or application 1834. Moreover, application 1834 may facilitate secure communication in an SVPN of a user.

Within electronic device 1800, processing subsystem 1810, memory subsystem 1812 and networking subsystem 1814 are coupled together using bus 1828. Bus 1828 may include an electrical, optical, and/or electro-optical connection that the subsystems can use to communicate commands and data among one another. Although only one bus 1828 is shown for clarity, different embodiments can include a different number or configuration of electrical, optical, and/ or electro-optical connections among the subsystems.

In some embodiments, electronic device 1800 includes a display subsystem 1826 for displaying information on a display, which may include a display driver, an I/O controller and the display, such as a liquid-crystal display, a multi-touch touchscreen (which is sometimes referred to as a touch-sensitive display), etc.

Electronic device 1800 can be (or can be included in) any electronic device with at least one network interface. For example, electronic device 1800 can be (or can be included in): a desktop computer, a laptop computer, a subnotebook/netbook, a server, a tablet computer, a smartphone, a smartwatch, a cellular telephone, a consumer-electronic device (such as a television, a set-top box, audio equipment, video equipment, etc.), a portable computing device, a wearable electronic device, an access point, a router, a switch, a network-attached-storage device, communication equipment, test equipment, and/or another electronic device.

Although specific components are used to describe electronic device 1800, in alternative embodiments, different components and/or subsystems may be present in electronic device 1800. For example, electronic device 1800 may include one or more additional processing subsystems, memory subsystems, networking subsystems, and/or display subsystems. Moreover, while one of antennas 1820 is shown coupled to a given one of interface circuits 1818, there may be multiple antennas coupled to the given one of interface circuits 1818. Additionally, one or more of the subsystems may not be present in electronic device 1800. Furthermore, in some embodiments, electronic device 1800 may include one or more additional subsystems that are not shown in FIG. 18. Also, although separate subsystems are shown in FIG. 18, in some embodiments, some or all of a given subsystem or component can be integrated into one or more of the other subsystems or component(s) in electronic device 1800. For example, in some embodiments program instructions 1822 are included in operating system 1824. Note that operating system 1824 may provide services such as: a web browser, a media server, a file-sharing server, a router and/or a firewall.

Moreover, the circuits and components in electronic device 1800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1814, such as one or more radios. Moreover, the integrated circuit may include hardware and/or software mechanisms that are used for transmitting wireless signals from electronic device 1800 and receiving signals at electronic device 1800 from other electronic devices. Aside from the mechanisms herein described, radios are generally known in the art and hence are not described in detail. In general, networking subsystem 1814 and/or the integrated circuit can include any number of radios.

In some embodiments, networking subsystem 1814 and/or the integrated circuit include a configuration mechanism (such as one or more hardware and/or software mechanisms) that configures the radios to transmit and/or receive on a given channel (e.g., a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, etc.) Furthermore, networking subsystem 1814 may include one or more wired interface circuits 1836 and one or more communication ports 1838 to receive and/or provide information in messages to other components in a system, such as electronic devices in an SVPN of a user.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While an SVPN was used as an illustration, in other embodiments the communication techniques are used to implement a secure, distributed storage environment and/or another secure online application.

Moreover, while communication protocols compatible with Wi-Fi and Ethernet was used as an illustrative example, the described embodiments may be used with a variety of network interfaces. Moreover, network 116 (FIG. 1) may include one or more public and/or private networks, such as the Internet, an intranet, etc. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1822, operating system 1824 (such as drivers for interface circuits 1818), authentication instructions 1832, application 1834 and/or in firmware in interface circuits 1818. Alternatively or additionally, at least some of the operations in the communication techniques may be implemented in a physical layer, such as hardware in interface circuits 1818.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
an interface circuit configured to communicate with a second computer;
memory configured to store program instructions; and
a processor, coupled to the interface circuit and the memory, configured to execute the program instructions, wherein, when executed by the processor, the program instructions cause the computer to perform operations comprising:
receiving, at the interface circuit, a verification query associated with the second computer, wherein the verification query comprises information specifying a verified persona, wherein an identity of an individual associated with the verified persona is anonymous to the second computer and is known to the computer based at least in part on a secure, virtual personal network (SVPN) that comprises the individual, and wherein the verified persona is associated with a distributed non-fungible token;
confirming that the verified persona is valid based at least in part on the verification query; and
providing, from the interface circuit, a verification response addressed to the second computer, wherein the verification response indicates whether the verified persona is valid, while keeping the identity of the individual associated with the verified persona anonymous to at least the second computer.

2. The computer of claim 1, wherein the providing, the receiving or both occur in a band of frequencies that is different from a second band of frequencies used by the SVPN.

3. The computer of claim 1, wherein the verification query is based at least in part on a distributed secure transaction associated with the distributed non-fungible token.

4. The computer of claim 1, wherein the information specifying the verified persona comprises a fictitious name of the individual or an identifier of the individual.

5. The computer of claim 1, wherein the verified persona is confirmed based at least in part on account information with a provider of the SVPN that is associated with a pre-existing account of the individual.

6. The computer of claim 5, wherein the account information comprises billing information and the verified persona or the identity of the individual is confirmed based on the billing information.

7. The computer of claim 5, wherein the verified persona obfuscates the identity of the individual from the provider; and
wherein confirming the verified persona comprises:
providing, from the interface circuit, a second verification query addressed to a third computer associated with a second provider, wherein the second verification query requests verification of the verified persona, the second provider is different from the provider, and the second provider comprises: a credit-card company, a type of bank, or another provider of a financial instrument associated with the individual; and
receiving, at the interface circuit, a second verification response associated with the third computer, wherein the second verification response indicates whether the verified persona is valid, while keeping the identity of the individual associated with the verified persona anonymous to the provider, and
wherein the verification response is based at least in part on the second verification response.

8. The computer of claim 1, wherein the operations comprise:
receiving, at the interface circuit, a request associated with the second computer, wherein the request indicates there is an emergency associated with the verified persona, or unwanted, potentially dangerous or possible criminal activity associated with the verified persona;
determining the identity of the individual based at least in part on the request; and
providing, from the interface circuit, a response addressed to the second computer, wherein the response specifies the identity of the individual, so that the individual is no longer anonymous to the second computer.

9. The computer of claim 8, wherein the operations comprise:
providing, from the interface circuit, an authorization request addressed to an electronic device associated with the individual, wherein the authorization request requests approval from the individual to provide the identity of the individual to the second computer; and
receiving, at the interface circuit, authorization associated with the electronic device, wherein the authorization approves the request and the providing of the response is based at least in part on the authorization.

10. A non-transitory computer-readable storage medium for use in conjunction with a computer, the computer-readable storage medium storing program instructions, wherein, when executed by the computer, the program instructions cause the computer to perform operations comprising:
receiving a verification query associated with a second computer, wherein the verification query comprises information specifying a verified persona, wherein an identity of an individual associated with the verified persona is anonymous to the second computer and is known to the computer based at least in part on a secure, virtual personal network (SVPN) that comprises the individual, and wherein the verified persona is associated with a distributed non-fungible token;
confirming that the verified persona is valid based at least in part on the verification query; and
providing a verification response addressed to the second computer, wherein the verification response indicates whether the verified persona is valid, while keeping the identity of the individual associated with the verified persona anonymous to at least the second computer.

11. The non-transitory computer-readable storage medium of claim 10, wherein the verification query is based at least in part on a distributed secure transaction associated with the distributed non-fungible token.

12. The non-transitory computer-readable storage medium of claim 10, wherein the verified persona is confirmed based at least in part on account information with a provider of the SVPN that is associated with a pre-existing account of the individual;
wherein the verified persona obfuscates the identity of the individual from the provider; and
wherein confirming the verified persona comprises:
providing a second verification query addressed to a third computer associated with a second provider, wherein the second verification query requests verification of the verified persona, the second provider is different from the provider, and the second provider comprises: a credit-card company, a type of bank, or another provider of a financial instrument associated with the individual; and
receiving a second verification response associated with the third computer, wherein the second verification response indicates whether the verified persona is valid, while keeping the identity of the individual associated with the verified persona anonymous to the provider, and
wherein the verification response is based at least in part on the second verification response.

13. The non-transitory computer-readable storage medium of claim 10, wherein the information specifying the verified persona comprises a fictitious name of the individual or an identifier of the individual.

14. A method for verifying a verified persona, comprising: by a computer:
receiving a verification query associated with a second computer, wherein the verification query comprises information specifying the verified persona, wherein an identity of an individual associated with the verified persona is anonymous to the second computer and is known to the computer based at least in part on a secure, virtual personal network (SVPN) that comprises the individual, and wherein the verified persona is associated with a distributed non-fungible token;
confirming that the verified persona is valid based at least in part on the verification query; and
providing a verification response addressed to the second computer, wherein the verification response indicates whether the verified persona is valid, while keeping the identity of the individual associated with the verified persona anonymous to at least the second computer.

15. The method of claim 14, wherein the verification query is based at least in part on a distributed secure transaction associated with the distributed non-fungible token.

16. The method of claim 14, wherein the verified persona is confirmed based at least in part on account information with a provider of the SVPN that is associated with a pre-existing account of the individual; and
wherein the verified persona obfuscates the identity of the individual from the provider; and
wherein confirming the verified persona comprises:
providing a second verification query addressed to a third computer associated with a second provider, wherein the second verification query requests verification of the verified persona, the second provider is different from the provider, and the second provider comprises: a credit-card company, a type of bank, or another provider of a financial instrument associated with the individual; and
receiving a second verification response associated with the third computer, wherein the second verification response indicates whether the verified persona is valid, while keeping the identity of the individual associated with the verified persona anonymous to the provider, and
wherein the verification response is based at least in part on the second verification response.

17. The method of claim 14, wherein the method comprises:
receiving, at the interface circuit, a request associated with the second computer, wherein the request indicates there is an emergency associated with the verified persona, or unwanted, potentially dangerous or possible criminal activity associated with the verified persona;
determining the identity of the individual based at least in part on the request; and
providing, from the interface circuit, a response addressed to the second computer, wherein the response specifies the identity of the individual, so that the individual is no longer anonymous to the second computer.

18. The method of claim 17, wherein the method comprises:
providing, from the interface circuit, an authorization request addressed to an electronic device associated with the individual, wherein the authorization request requests approval from the individual to provide the identity of the individual to the second computer; and
receiving, at the interface circuit, authorization associated with the electronic device, wherein the authorization approves the request and the providing of the response is based at least in part on the authorization.

19. The method of claim 17, wherein the providing, the receiving or both occur in a band of frequencies that is different from a second band of frequencies used by the SVPN.

20. The method of claim 17, wherein the information specifying the verified persona comprises a fictitious name of the individual or an identifier of the individual.

* * * * *